(12) United States Patent
Angervaks et al.

(10) Patent No.: US 12,124,036 B2
(45) Date of Patent: Oct. 22, 2024

(54) HOLOGRAPHIC WAVEGUIDE, METHOD OF PRODUCING THE SAME, AND DISPLAY DEVICE INCLUDING THE HOLOGRAPHIC WAVEGUIDE

(71) Applicant: SAMSUNG ELECTRONICS CO., LTD., Suwon-si (KR)

(72) Inventors: Aleksandr Evgenyevich Angervaks, St. Petersburg (RU); Nikolay Viktorovich Muravyev, Podolsk (RU); Vladimir Nikolaevich Borisov, St. Petersburg (RU); Roman Aleksandrovich Okun, St. Petersburg (RU); Gavril Nikolaevich Vostrikov, Kraskovo (RU); Mikhail Vyacheslavovich Popov, Krasnogorsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 572 days.

(21) Appl. No.: 17/411,951

(22) Filed: Aug. 25, 2021

(65) Prior Publication Data

US 2022/0091419 A1    Mar. 24, 2022

(30) Foreign Application Priority Data

Sep. 22, 2020    (RU) ............................. 2020131229
Feb. 24, 2021    (KR) ....................... 10-2021-0025124

(51) Int. Cl.
*G02B 27/01*    (2006.01)
*G02B 5/32*    (2006.01)
*G02B 27/42*    (2006.01)

(52) U.S. Cl.
CPC .......... *G02B 27/0172* (2013.01); *G02B 5/32* (2013.01); *G02B 27/4216* (2013.01); *G02B 2027/0174* (2013.01); *G02B 2027/0178* (2013.01)

(58) Field of Classification Search
CPC .. G02B 27/0172; G02B 5/32; G02B 27/4216; G02B 2027/0174; G02B 2027/0178;
(Continued)

(56) References Cited

U.S. PATENT DOCUMENTS 5,602,950 A    2/1997    Saitoh et al.
8,717,574 B2    5/2014    Yang et al.
(Continued)

FOREIGN PATENT DOCUMENTS

CN    101467089 A    6/2009
CN    101473439 A    7/2009
(Continued)

OTHER PUBLICATIONS

Machine Translation of CN-107015368-A (Year: 2017).*
(Continued)

*Primary Examiner* — William R Alexander
*Assistant Examiner* — Matthew Y Lee
(74) *Attorney, Agent, or Firm* — Sughrue Mion, PLLC

(57) ABSTRACT

Provided is a holographic waveguide including a waveguide element configured to guide light, and a diffractive optical element including an aberration correction hologram pattern, the diffractive optical element being provided adjacent to the waveguide element and configured to correct aberrations generated in the light traveling along the waveguide element by the waveguide element.

19 Claims, 18 Drawing Sheets

(58) Field of Classification Search
CPC .............. G02B 27/017; G02B 27/0101; G02B 27/0149; G02B 2027/0138; G02B 2027/014; G02B 27/0103; G02B 27/0025; G02B 2027/011; G02B 27/4211; G02B 27/4205; G02B 13/18

See application file for complete search history.

(56) References Cited

U.S. PATENT DOCUMENTS

| | | | |
|---|---|---|---|
| 8,842,370 | B2 | 9/2014 | Jethmalani et al. |
| 9,023,278 | B2 | 5/2015 | Atkin |
| 9,348,143 | B2 | 5/2016 | Gao et al. |
| 9,759,919 | B2 | 9/2017 | Travis et al. |
| 9,933,684 | B2 | 4/2018 | Brown et al. |
| 10,002,215 | B2 | 6/2018 | Dowski et al. |
| 10,394,032 | B2 | 8/2019 | Singer et al. |
| 11,009,710 | B2 | 5/2021 | Tekolste et al. |
| 2006/0042321 | A1 | 3/2006 | Lewis et al. |
| 2006/0221448 | A1* | 10/2006 | Nivon ............... G02B 6/0076 359/566 |
| 2006/0228073 | A1* | 10/2006 | Mukawa ............... G02B 5/18 385/31 |
| 2011/0122416 | A1 | 5/2011 | Yang et al. |
| 2011/0157667 | A1 | 6/2011 | Lacoste et al. |
| 2015/0235460 | A1 | 8/2015 | Schowengerdt et al. |
| 2016/0154245 | A1 | 6/2016 | Gao et al. |
| 2016/0202427 | A1 | 7/2016 | Smith et al. |
| 2018/0172981 | A1 | 6/2018 | Ishii |
| 2018/0299678 | A1* | 10/2018 | Singer ............... G02B 6/005 |
| 2018/0364482 | A1 | 12/2018 | Georgiou et al. |
| 2019/0072767 | A1* | 3/2019 | Vallius ............... H04N 9/646 |
| 2019/0155034 | A1 | 5/2019 | Singer et al. |
| 2019/0260977 | A1 | 8/2019 | McGrew |
| 2019/0369403 | A1* | 12/2019 | Leister ............... G03H 1/268 |
| 2020/0174255 | A1* | 6/2020 | Hollands ............... G02B 6/00 |
| 2020/0249484 | A1* | 8/2020 | Waldern ............... G02B 26/105 |
| 2020/0342577 | A1 | 10/2020 | Rodriguez et al. |

FOREIGN PATENT DOCUMENTS

| | | | | |
|---|---|---|---|---|
| CN | 105487170 | A | 4/2016 | |
| CN | 103995354 | B | 5/2016 | |
| CN | 103688208 | B | 6/2017 | |
| CN | 107015368 | A * | 8/2017 | ......... G02B 27/0172 |
| CN | 106909047 | B | 6/2019 | |
| CN | 109863533 | A | 6/2019 | |
| CN | 110584593 | A | 12/2019 | |
| EP | 3811851 | A1 | 4/2021 | |
| JP | 3-230102 | A | 10/1991 | |
| RU | 2 719 568 | C1 | 4/2020 | |
| WO | 2004/048285 | A1 | 6/2004 | |
| WO | 2008/020899 | A2 | 2/2008 | |
| WO | 2009/126264 | A2 | 10/2009 | |
| WO | 2009131626 | A2 | 10/2009 | |
| WO | 2012088478 | A1 | 6/2012 | |
| WO | WO-2014140620 | A2 * | 9/2014 | ......... G02B 27/0103 |
| WO | 2014/159621 | A1 | 10/2014 | |
| WO | 2014209431 | A1 | 12/2014 | |
| WO | 2015038932 | A1 | 3/2015 | |
| WO | 2015081313 | A2 | 6/2015 | |
| WO | 2018231473 | A1 | 12/2018 | |

OTHER PUBLICATIONS

International Search Report (PCT/ISA/210) dated Nov. 10, 2021 issued by the International Searching Authority in International Application No. PCT/KR2021/009665.

Kogelnik, et al. "Holographic Imaging Through a Random Medium", J. Opt. Soc. Am., 1968, vol. 58, 2 pages total.

Downie, J., "Real-time holographic image correction using bacteriorhodopsin", 1994, Applied Optics, vol. 33, No. 20, 5 pages total.

Communication dated Apr. 19, 2021 issued by the Russian Intellectual Property Office in counterpart Russian Application No. 2020131229.

* cited by examiner

HOLOGRAPHIC WAVEGUIDE, METHOD OF PRODUCING THE SAME, AND DISPLAY DEVICE INCLUDING THE HOLOGRAPHIC WAVEGUIDE

CROSS-REFERENCE TO RELATED APPLICATIONS

This application is based on and claims priority under 35 U.S.C. § 119 to Russian Patent Application No. 2020131229, filed on Sep. 22, 2020, in the Federal Service for Intellectual Property, Patents and Trademarks Office, and Korean Patent Application No. 10-2021-0025124, filed on Feb. 24, 2021, in the Korean Intellectual Property Office, the disclosures of which are incorporated by reference herein in their entireties.

BACKGROUND

1. Field

The disclosure relates to optical waveguides and virtual and augmented reality displays including the same.

2. Description of Related Art

The technology of virtual and augmented reality devices is based on superimposing a virtual image on a real-world scene. Most current virtual and augmented reality devices are based on the technology of waveguides having an optical element structure that guides a virtual image to a human eye. For virtual and augmented reality devices, in addition to a wide field of view (FOV), miniaturization, weight reduction, and cost reduction, there is a need to provide high-resolution images without aberrations.

In order to provide a high-quality virtual image in an existing waveguide-based virtual and augmented reality device having a diffractive optical element or a holographic optical element, attention must be paid to the quality of a wavefront transmitted through the waveguide. Distortion or inhomogeneity of the waveguide and the holographic media themselves may cause wavefront aberrations and degrade the quality of a virtual image. Correcting aberrations requires special effort during the production or operation phase of virtual and augmented reality devices.

FIG. 1 schematically illustrates a reduction in image quality in a virtual and augmented reality device 101 according to the related art. In general, transmission of an image from an image projector 102 of the virtual and augmented reality device 101 to a user's eye may be divided into four phases.

A source image 103 may be input from the image projector 102 to a waveguide 104.

The image may be transmitted through the structure of the waveguide 104 including diffractive optical elements 106, 107, and 108.

Because defects of the structure of the diffractive optical elements 106, 107, and 108 and the waveguide 104 may cause distortion to a wavefront passing through the diffractive optical elements 106, 107, and 108 and the waveguide 104, aberrations are generated in the source image 103 passing through the waveguide 104, prior to the image passing through the diffractive optical elements 106, 107, and 108 to reach the user's eye.

For example, when a plane input wave 105 is transmitted to the input diffractive optical element 106 of the waveguide 104, an output wave 109 imparted with aberrations due to the defects described above will be output from the output diffractive optical element 108 of the waveguide 104.

In the absence of special processes, when the image is transmitted directly from the waveguide 104 into the user's eye, the user will view an aberrated image 110 rather than the source image 103.

Accordingly, the existing virtual and augmented reality device performs post-processing on the image that has passed through the structure of the waveguide 104 by passing through the diffractive optical elements 106, 107, and 108, and then, a corrected virtual image 111 without aberrations may be guided to the user's eye.

Image correction of virtual and augmented reality devices according to the related art requires the use of additional elements as part of the virtual and augmented reality devices to guide high-quality virtual images to the user's eyes. The additional elements correct aberrations of an image that has passed through the structure of a waveguide including diffractive optical elements.

However, the inclusion of additional elements may complicate the design of the device and increase the size and cost of the device.

Personalized correction and optimization of high-order aberrations of the human eye when using binoculars, rifle scopes, telescopes, microscopes, night vision goggles and laser eye protection devices may be available.

The disadvantage of this technical solution is related to the fact that an additional correction element having a three-layered structure, which is specially produced for correction of aberrations and is made of a polymer, is used to be incorporated into the devices. This correction element has a limited lifetime.

Turbidity suppression by optical phase conjugation may be implemented. A detector for detecting light transmitted through a turbid medium includes one or more digital optical phase conjugation (DOPC) devices each including a wavefront sensor, for example, a charge-coupled device (CCD) array, for detecting light that has been transmitted through the turbid medium, and a spatial light modulator (SLM) for outputting, in response to the light detected by the sensor, output light that is an optical phase conjugate of the input light.

The disadvantage of this technical solution of turbidity suppression is that the DOPC update rate is determined by the rate of the SLM used, i.e., dynamic use restrictions.

The image fidelity of a waveguide display system may be improved by a display device including a waveguide, a reconfigurable phase mask, and a controller. The controller dynamically reconfigures the reconfigurable phase mask so as to modulate display light in accordance with a detected position of an eye viewing an image and/or a parameter for a shape of the waveguide.

The disadvantage of this solution is related to the fact that a waveguide display system has a special controller for electronic image correction, which makes the design more complex and bulky.

Image and wave field projection through diffusive media may be implemented. A system for projecting an object wave field into a projection volume includes a wave scatterer and a wave field projector configured to project a wave field onto the wave scatterer. A controller is configured to cause the wave field projector, upon interacting with the wave scatterer (diffusive object(s)), to project a wave field that is redirected to form an object wave field that forms a predefined pattern in the projection volume.

In order to obtain an undistorted image, an image is pre-distorted, and then the pre-distorted is propagated through a diffusive object. A special correction procedure is used to calculate a transmission matrix of the diffusive object, and this complicates the operation of the device and requires an additional element for modify the image.

A system and a method for transmitting a source image may be implemented. Light transmitted from a source image has a field angle spectrum. An optical system includes an optical waveguide arrangement, in which light may propagate by total internal reflection. The optical system also includes a diffractive optical input coupling arrangement for coupling the light emanating from the source image into the optical waveguide arrangement. The optical system further includes a diffractive optical output coupling arrangement for coupling the light that has propagated in the optical waveguide arrangement out from the optical waveguide arrangement. A waveguide includes a diffraction correction device having a diffraction grating structure for correcting aberrations of the wavefront of transmitted light.

The disadvantage of this device is related to the complex structure of a waveguide device due to the presence of a special correction device. In addition, for a specific waveguide and a specific grating structure, their own correction arrangements need to be calculated.

A holographic display system including a waveguide, a light source configured to introduce light into the waveguide at a controllable light input angle, and a holographic optical element (HOE) configured to out-couple, from the waveguide, light received within the waveguide may be implemented. The display system may further include a controller configured to control the light input angle and also to control a corrective component downstream of the holographic optical element to correct aberrations of the light by the holographic optical element based on the light input angle.

The disadvantage of this device is the fact that it uses a special correction HOE-based element to correct optical aberrations and uses the controller to perform a correction process, which complicates the design of the device and increases the costs.

Therefore, there is a need to develop a simpler and less expensive device that guarantees the quality of an image transmitted through a waveguide.

SUMMARY

Provided are a waveguide to be positioned near a user's eye to guide a virtual image to the user's eye, and a method of producing the waveguide.

Also provided are a virtual and augmented reality device including a waveguide including a diffractive optical element or a holographic optical element.

Additional aspects will be set forth in part in the description which follows and, in part, will be apparent from the description, or may be learned by practice of the presented embodiments.

According to an aspect of the disclosure, there is provided a holographic waveguide including a waveguide element configured to guide light, and a diffractive optical element including an aberration correction hologram pattern, the diffractive optical element being provided adjacent to the waveguide element and configured to correct aberrations generated in the light traveling along the waveguide element by the waveguide element.

The diffractive optical element may include a recordable medium, and the aberration correction hologram pattern may be recorded on the recordable medium.

The recordable medium may include photopolymers, photothermoplastics, photochromic materials, photothermorefractive materials, photoresists, silver halide photographic materials, dichromated gelatins, or chalcogenide materials.

The aberration correction hologram pattern may be an interference pattern of an aberration-free reference wave and a pre-aberrated object wave with phase-conjugated aberrations with respect to aberrations caused by a local structure including the waveguide element and the recordable medium.

The pre-aberrated object wave may be formed by detecting aberrations of an inspection wave configured to pass the local structure, obtaining the phase-conjugated aberrations with respect to the detected aberrations, and imparting the phase-conjugated aberrations to an object wave based on a light modulator.

An angle at which the pre-aberrated object wave is incident on the recordable medium when forming the aberration correction hologram pattern may be equal to an angle at which the inspection wave is incident on the local structure.

A Shack-Hartmann wavefront sensor, a charge-coupled device (CCD) array, or a complementary metal-oxide-semiconductor (CMOS) array may be configured to detect the aberrations of the inspection wave.

The phase-conjugated aberrations may be obtained based on a phase-shifting interferometry technique.

The light modulator may be a micromirror space-time light modulator, a liquid crystal space-time light modulator, or an acousto-optic space-time light modulator.

The diffractive optical element may include an input diffractive optical element configured to input light into the waveguide element, and an output diffractive optical element configured to output, to an outside of the waveguide element, the light input into the input diffractive optical element and guided in the waveguide element.

The diffractive optical element may further include an enlargement diffractive optical element configured to increase a geometric dimension of an image included in the light input into the waveguide element.

The waveguide element may be formed of a photosensitive material, and the aberration correction hologram pattern may be recorded directly on a surface of the waveguide element.

The aberration correction hologram pattern may be an interference pattern of an aberration-free reference wave and an object wave aberrated after passing through the waveguide element.

The recordable medium may be a thin holographic medium, and the aberration correction hologram pattern may be an interference pattern of an aberration-free reference wave and an object wave aberrated after passing through the waveguide element.

The waveguide element may include a defect or inhomogeneity.

According to an aspect of the disclosure, there is provided a virtual and augmented reality device including a holographic waveguide including a waveguide element configured to guide light, and a diffractive optical element including an aberration correction hologram pattern, the diffractive optical element being provided adjacent to the waveguide element and configured to correct aberrations generated in the light traveling along the waveguide element by the waveguide element, and an image source configured to provide, through the holographic waveguide, an image to be delivered to a user's eye.

The virtual and augmented reality device may be a wearable device.

According to an aspect of the disclosure, there is provided a method of producing a holographic waveguide, the method including providing an inspection wave to be incident on a local structure including a waveguide element and a recordable medium fragment, detecting aberrations of the inspection wave that has passed through the local structure, and obtaining phase-conjugated aberrations with respect to the detected aberrations, forming a pre-aberrated object wave by imparting the phase-conjugated aberrations to an object wave, and recording, on the recordable medium fragment, an interference pattern of an aberration-free reference wave and the pre-aberrated object wave.

An angle at which the pre-aberrated object wave is incident on the recordable medium may be equal to an angle at which the inspection wave is incident on the local structure.

The aberrations of the inspection wave may be detected by a Shack-Hartmann wavefront sensor, a CCD array, or a CMOS array.

The phase-conjugated aberrations may be obtained based on a phase-shifting interferometry technique.

The phase-conjugated aberrations may be imparted on the object wave by a micromirror space-time light modulator, a liquid crystal space-time light modulator, or an acousto-optic space-time light modulator.

According to an aspect of an embodiment, there is provided a holographic waveguide including a waveguide element configured to guide light, and a diffractive optical element comprising an aberration correction hologram pattern, the diffractive optical element being provided on the waveguide element and configured to correct aberrations generated in the light traveling along the waveguide element, wherein the aberration correction hologram pattern is an interference pattern of an aberration-free reference wave and an object wave aberrated after passing through the waveguide element.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
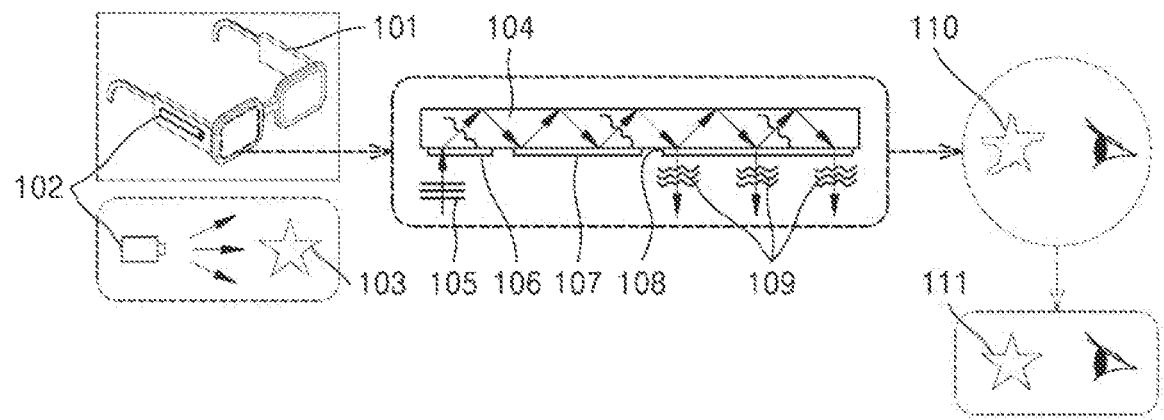
FIG. 1 is a diagram illustrating an example in which an image is transmitted from a project to a user's eye in a virtual and augmented reality device according to the related art.

Hereinafter, embodiments of the disclosure will be described in detail with reference to the accompanying drawings. In the following drawings, like reference numerals denote like elements, and the size of each element may be exaggerated for clarity and convenience of description.

In the following description, when an element is referred to as being "above" or "on" another element, it may be directly on the other element while making contact with the other element or may be above the other element without making contact with the other element.

Singular expressions may include the meaning of plural expressions as long as there is no definite difference therebetween in the context. In addition, when an element is referred to as "including" a constituent element, other constituent elements may be further included not excluded unless there is any other particular mention on it.

The term "the" and other demonstratives similar thereto should be understood to include a singular form and plural forms. The elements referred to in the singular do not exclude a plurality of elements, unless otherwise specified.

Terms such as "first" and "second" may be used to describe various elements, but the elements should not be limited by the terms. The terms are used only to distinguish one element from another element.

In the present description, the term "and/or" includes any and all combinations of one or more of the respective listed items.

The term hologram pattern herein may be a diffractive optical element produced by interference of light waves or by laser and electron lithography.

The term object wave herein may be one of waves that form an interference pattern when producing a hologram pattern, that contains information to be reproduced or converted.

The term reference wave herein may be one of waves that form an interference pattern when obtaining a hologram pattern, that is generally used to reconstruct an object wave. In general, the reference wave has a simple and easily reproducible shape, for example, a plane shape or a sphere shape.

The term recordable medium as used herein may include a holographic medium or a diffractive medium.

The term diffractive medium may be a material carrier with a specific physical property, in which a microstructure having a constant or variable period according to a given rule is formed on the surface or in the volume.

The term holographic medium as used herein may be a medium, optical properties (e.g., transmittance, refractive index, etc.) of which undergo change when exposed to light, and which remains in the medium for a sufficiently long time until the moment when recovering recorded data occurs from said medium, or for a longer time. A feature of a hologram recording medium is that it has a high spatial resolution, and thus an interference pattern representing a hologram may be directly recorded thereon.

The term holographic medium with a significantly low recording threshold as used herein may be to a holographic medium, properties of which begin to change even when a weak, low-energy wave is radiated thereto.

The term thin holographic medium as used herein may be a holographic medium with a thickness in which effects related to a finite thickness is negligible.

The term diffractive optical element as used herein may be an optical element that has a hologram pattern or a microstructure having a constant or variable period according to a given rule, and converts transmitted or reflected light as a result of diffraction by the hologram pattern or the microstructure. The term diffractive optical element may be used in the sense including holographic optical element.

The term transmissive diffractive optical element may be a diffractive optical element that light is converted when light passes through the element.

The term reflective diffractive optical element may be a diffractive optical element that light is converted when light is reflected from the element.

The term space-time light modulator (STLM) as used herein may be a device capable of changing parameters (amplitude, phase, polarization) of light radiation in time and space.

The term micromirror space-time light modulator (MSTLM) as used herein may be a microelectromechanical system (MEMS) that creates an image by an array of micromirrors having deflection piezoelectric elements, each mirror representing one pixel of a projected image.

The term liquid crystal space-time light modulator (LC STLM) as used herein may be a system based on a transparent or reflective LC microdisplays. The LC STLM modulates the amplitude or phase of light according to a change in the refractive index of an optical medium, for example, as a result of reorientation of liquid crystal molecules or phase transition of liquid crystals.

The term acousto-optic space-time light modulator (AO STLM) as used herein may be a device that deflects a light beam by diffraction on a grating formed in glass as a result of spatial modulation of a refractive index by an acoustic wave. The principle of operation of the acousto-optic space-time light modulator is based on diffraction of light by an ultrasonic wave traveling in an optically transparent material, for example, glass. The traveling ultrasound is generated by a piezoelectric transducer attached to a glass plate. A diffraction grating is formed in the medium due to a compressed region and a deformed region and a difference in the refractive indices that arise in the glass. Light beams diffracted on the grating form output light beams of various orders of diffraction spaced apart at the same angle with respect to each other. By using an aperture, the first maximum, which exists only in a case where a sound wave exists in the modulator, is selected from among all output beams, and the rest are blocked.

The term computer-readable storage medium as used herein may be any means or group of means capable of storing data and/or commands for a certain period of time. The computer-readable storage media may include, but is not limited to, storage media such as direct access storage (e.g., hard disk drives or floppy disks), sequential access storage devices (e.g., tape drives), compact discs, CD-ROMs, DVDs, random access memory (RAM), read-only memory (ROM), electrically erasable programmable read-only memory (EEPROM), and/or flash memory, as well as communication media such as wires, optical fibers and other electromagnetic and/or optical media, and/or any combination of the above devices.

Figure 2:
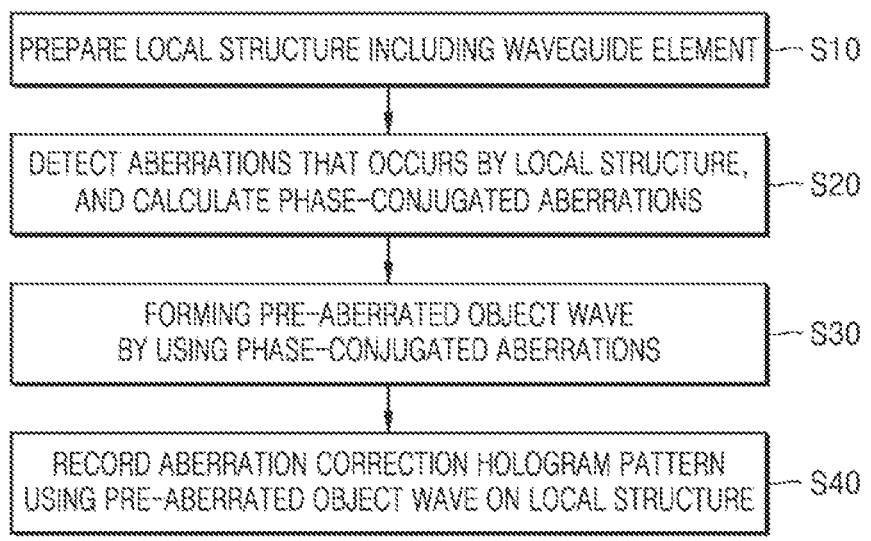
FIG. 2 is a flowchart illustrating a process of forming a holographic waveguide according to an embodiment.

FIG. 2 is a flowchart illustrating a process of forming a holographic waveguide according to an embodiment.

In operation S10, a local structure including a waveguide element may be prepared. The local structure may include the waveguide element, and a recordable medium constituting an optical element that couples light into and out of the waveguide element or redirects light in the waveguide element.

Then, in operation S20, aberrations that occurs due to the local structure may be detected, and phase-conjugated aberrations with respect to the detected aberrations may be calculated. In order to detect the aberrations, an inspection wave may be transmitted through the local structure. The wave element or the recordable medium may have a defect (e.g., non-uniformity, unevenness, etc.) that causes an aberration, and accordingly, the inspection wave that has passed therethrough may be aberrated.

Then, in operation S30, a pre-aberrated object wave may be formed by using the calculated phase-conjugated aberrations. To this end, a method of imparting the calculated phase-conjugated aberrations to an object wave by using an optical modulator may be used.

Then, in operation S40, an aberration correction hologram pattern using the pre-aberrated object wave may be recorded in the local structure used for the detection of the aberrations of the inspection wave. An interference pattern of an aberration-free reference wave and the pre-aberrated object wave may be recorded on the recordable medium as an aberration correction hologram pattern.

The holographic waveguide formed according to this method may include the waveguide element and the aberration correction hologram pattern, and when transmitting an image through the holographic waveguide, aberrations caused by the waveguide element and aberrations caused by media of other optical elements provided in the waveguide element may be corrected by itself. Accordingly, an input original image may be output at a high quality without aberrations generated while traveling through the holographic waveguide.

Figure 3:
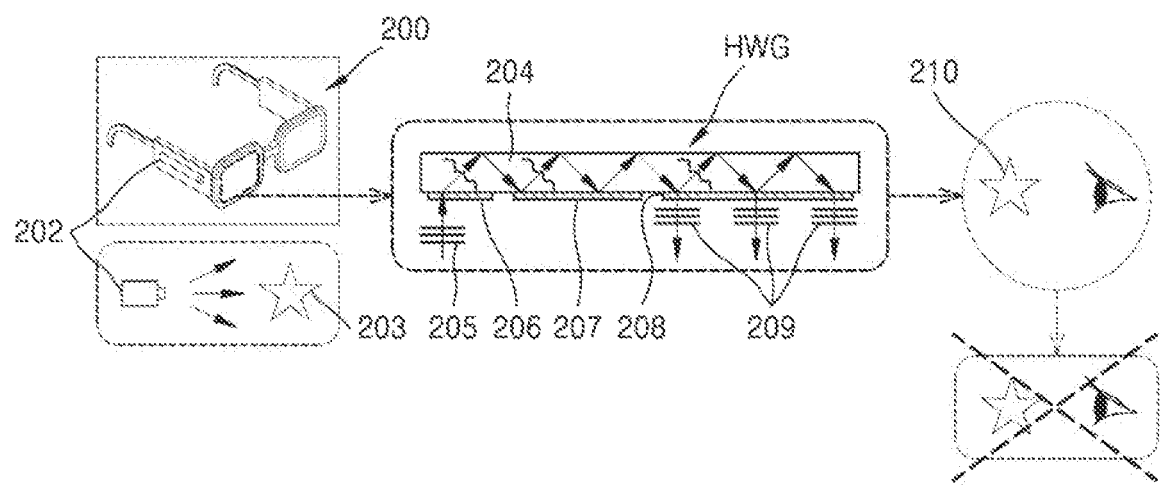
FIG. 3 is a diagram illustrating an example in which a virtual and augmented reality device including a holographic waveguide provides an image to a user's eye according to an embodiment.

FIG. 3 is a diagram illustrating an example in which a virtual and augmented reality device 200 including a holographic waveguide provides an image to a user's eye according to an embodiment.

Referring to FIG. 3, the virtual and augmented reality device 200 may include an image source 202 that provides a source image 203, and a holographic waveguide HWG that transmits light containing the source image 203 provided by the image source 202 to the user's eye.

The holographic waveguide HWG may include a waveguide element 204 that guides light therein, and one or more diffractive optical elements 206, 207, and 208, for example, the input diffractive optical element 206, the enlargement diffractive optical element 207, and the output diffractive optical element 208, at one side of the waveguide element 204. The one or more diffractive optical elements 206, 207, and 208 may perform a function of coupling light into and out of the waveguide element 204 or redirecting light in the waveguide element 204, and may include an aberration correction hologram pattern.

The aberration-free source image 203 may be input from the image source 202 (e.g., a projector) to the holographic waveguide HWG.

The light containing the image may be transmitted along the waveguide element 204 including the diffractive optical elements 206, 207, and 208. Unlike in FIG. 1, because of the use of the holographic waveguide HWG, produced according to a method proposed by an embodiment, including the diffractive optical elements 206, 207, and 208, at least one of which has recorded thereon the aberration correction hologram pattern, aberrations caused by the waveguide element 204 and media of the diffractive optical elements 206, 207, and 208 may be compensated for by the aberration correction hologram pattern.

For example, when a plane input wave 205 is transmitted to the input diffractive optical element 206, an aberration-free plane output wave 209 may be emitted from the output diffractive optical element 208.

An aberration-free virtual image 210 may be guided to the user's eye from the holographic waveguide HWG.

Accordingly, the virtual and augmented reality device 200 including the holographic waveguide HWG according to an embodiment does not require an image post-processing operations which is required in the virtual and augmented reality device 101 according to the related art.

The one or more diffractive optical elements 206, 207, and 208 may be provided in order to perform the function of coupling light into and out of the waveguide element 204 or redirecting light in the waveguide element 204. For example, the input diffractive optical element 206 may couple light into the waveguide element 204 from the outside of the waveguide element 204, and the output diffractive optical element 208 may couple light out of the waveguide element 204 from the inside of the waveguide element 204. In addition, the enlargement diffractive optical element 207 may increase the geometric dimensions of the image contained in light while the path of the light traveling along the waveguide element 204 is being redirected in the waveguide element 204. However, this is merely an example, and only the input diffractive optical element 206 and the output diffractive optical element 208 may be provided, or other additional diffractive optical elements may be further provided.

In the above description, the waveguide element 204 may not be ideal, that is, it may have defects such as non-uniformity or unevenness, and may cause aberrations in a wavefront propagating along the waveguide element 204. Furthermore, the media of the diffractive optical elements 206, 207, and 208 having recorded thereon the aberration correction hologram pattern may also not be ideal, and may cause aberrations in the wavefront passing therethrough.

According to embodiments, by introducing the aberration correction hologram pattern that corrects aberrations that may be caused by the waveguide element 204 and the media of the diffractive optical elements 206, 207, and 208, the aberration-free virtual image 210 may be provided to the user's eye.

Therefore, for manufacturing the virtual and augmented reality according to an embodiment of the disclosure, serial waveguides and standard holographic media may be used. For example, materials, the properties of which are not ideal, and which may cause aberrations in a wavefront, may be used.

FIGS. 4A to 4F illustrate an order of producing a holographic waveguide according to an embodiment.

Figure 4A:
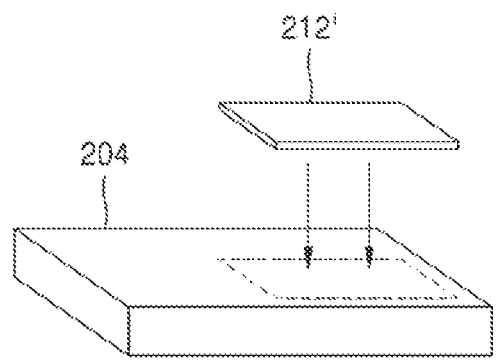
FIGS. 4A, 4B, 4C, 4D, 4E, and 4F are illustrate a process of producing a holographic waveguide according to an embodiment.

As illustrated in FIG. 4A, as a recordable medium, a holographic medium fragment 212' may be fixed to the waveguide element 204. The waveguide element 204 may have a flat or curved shape. The waveguide element 204 may have a defect that causes an aberration. The holographic medium fragment 212' may be a material of a diffractive optical element with a diffraction pattern suitable for functions such as, for example, input, output, enlargement, etc., that the holographic medium fragment 212' is required to perform with the waveguide element 204, and may be fixed to a specific position of the waveguide element 204 to perform the functions. The position at which the holographic medium fragment 212' is fixed may be defined by the design of the virtual and augmented reality device. Although one holographic medium fragment 212' is illustrated, this is merely an example, and a plurality of holographic medium fragments may be provided.

Figure 4B:
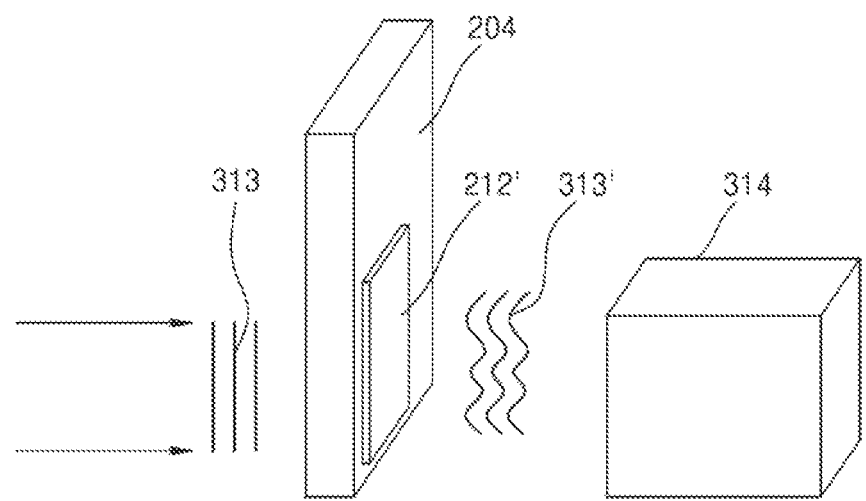

Referring to FIG. 4B, detection of aberrations caused by a local structure formed by the waveguide element 204 and the holographic medium fragment 212' may be performed by using an inspection wave 313. In this case, the inspection wave 313 may have a planar, spherical, or specially selected wavefront shape. The specially selected wavefront shape of the inspection wave 313 may be set by using an existing or diffractive optical element, a space-time light modulator, or a combination thereof.

The inspection wave 313 may be aberrated after passing through the local structure formed by the aberrating waveguide element 204 and the aberrating holographic medium fragment 212'. The aberrations of an inspection wave 313' that has passed through the local structure may be detected by a wavefront detection and phase conjugation unit 314, and its operations will be described in more detail below. Thereafter, by using phase and amplitude values of the inspection wave 313' obtained by a phase-shifting interferometry technique, phase-conjugated aberrations with respect to the aberrations of the inspection wave 313' that has passed through the local structure may be calculated by the wavefront detection and phase conjugation unit 314. The data obtained by the calculation may be stored in a computer-readable storage medium for use in the next operation of the method.

Figure 4C:
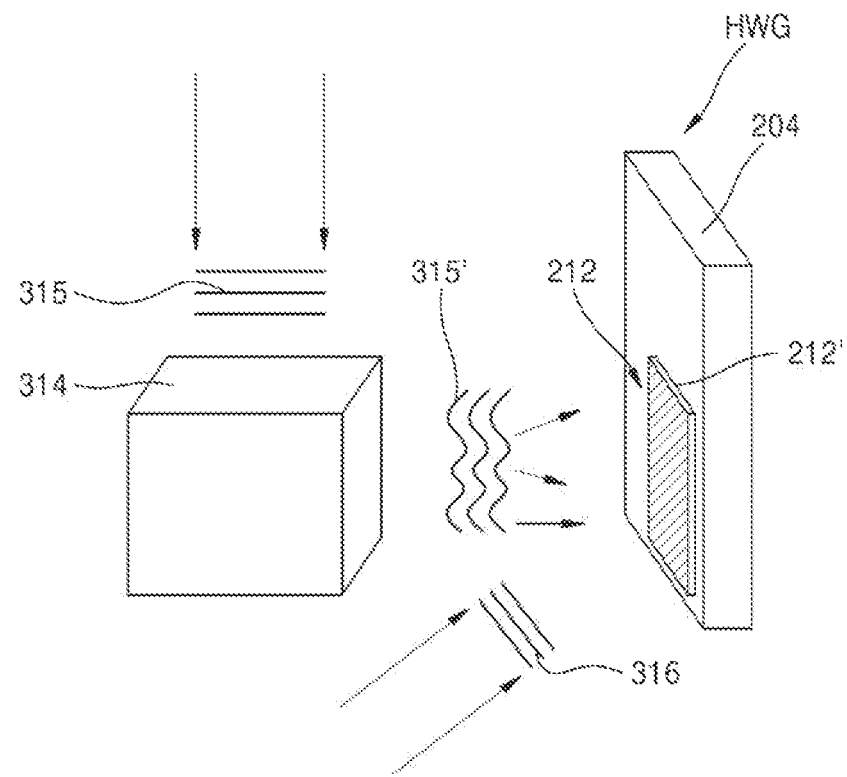
Figure 4D:
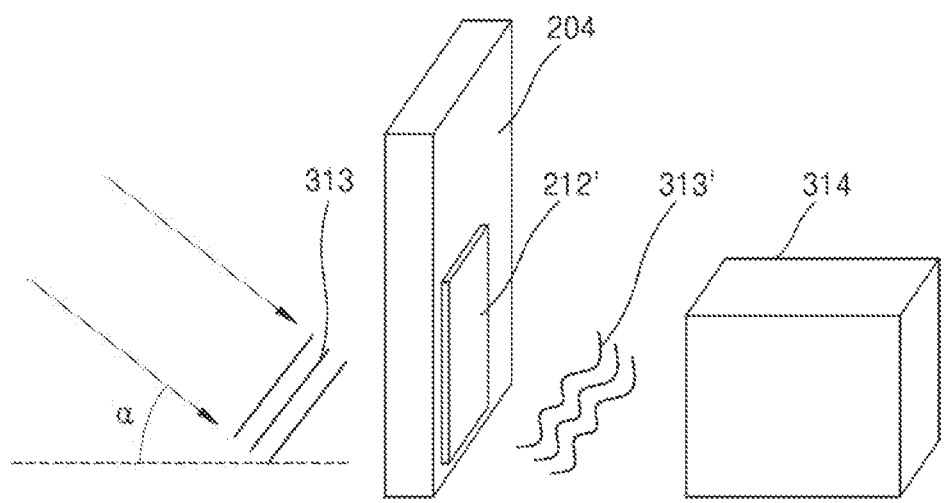
Figure 4E:
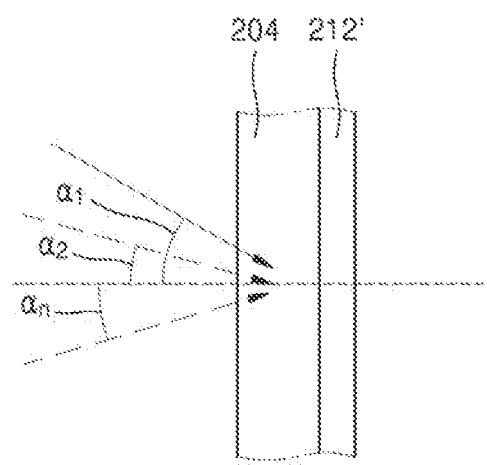

As further illustrated in FIGS. 4D and 4E, in the operation of detecting the aberrations illustrated in FIG. 4B, the inspection wave 313 may be transmitted to a surface of the waveguide element 204 at an arbitrary angle α.

The inspection wave 313 incident on the surface of the waveguide element 204 at the arbitrary angle α may pass through the local structure formed by the waveguide element 204 and the holographic medium fragment 212' along a specific path, and thus be aberrated. Aberrations by the waveguide element 204 and the holographic medium fragment 212' with respect to different angles $α_1, α_2, \ldots α_n$ at which the inspection wave 313 is incident may be detected, respectively.

Measurement using the phase-shifting interferometry technique described above is based on interferograms of a number of interferometers on a plane of a photodetector (e.g., a CCD array included in the device 314) by two light beams, which are a beam that has passed through a disturbing medium and thus been aberrated, and an aberration-free reference beam. The phase of the reference wave may be changed stepwise according to a phase shift, the resulting interference pattern may be computer-processed by using a special algorithm, and thus a complex amplitude distribution of a distorted wave may be obtained.

As illustrated in FIG. 4C, information obtained with respect to the aberrations of the inspection wave 313' that has passed through the local structure formed by the waveguide element 204 and the holographic medium fragment 212' may be recorded on the holographic medium fragment 212' as an aberration correction hologram pattern, and thus a diffractive optical element 212 may be formed. That is, the holographic waveguide HWG including the aberration correction hologram pattern may be produced. To this end, a pre-aberrated object wave 315' having phase-conjugated aberrations with respect to the aberrations of the inspection wave 313' that has passed through the local structure formed by the waveguide element 204 and the holographic medium fragment 212' may be first formed. The formation of the pre-aberrated object wave 315' may be achieved by transmitting an object wave 315 to the wavefront detection and phase conjugation unit 314. The object wave 315 may be aberrated by using a micromirror space-time light modulator, a liquid crystal space-time light modulator, or an audio-optic space-time light modulator, according to the calculated phase-conjugated aberrations.

When forming the diffractive optical element 212 by recording the aberration correction hologram pattern on the holographic medium fragment 212', the object wave 315' having the phase-conjugated aberrations and an aberration-free reference wave 316 with a planar, spherical, or specially selected wavefront shape may be used. For example, an interference pattern of the pre-aberrated object wave 315' and the aberration-free reference wave 316 may be recorded on the holographic medium fragment 212', and thus the diffractive optical element 212 may be formed. In this case, the specially selected wavefront shape of the reference wave 316 may be set by using an existing or diffractive optical element, a space-time light modulator, or a combination thereof.

During a time period for which the interference pattern is being recorded, and a time period for which the waveguide element 204 is operating afterward, the holographic medium fragment 212' has to remain fixed to the same position of the waveguide element 204 as in the operation of detecting the aberrations by using the inspection wave 313. In a case where this condition is met, the phase-conjugated aberrations are able to correct aberrations that occur when the object wave 315 passes through the same optical path as that used when detecting the aberrations of the inspection wave 313' that has passed through the local structure formed by the waveguide element 204 and the holographic medium fragment 212', and used when recording the hologram pattern on the holographic medium fragment 212'.

As described above, according to an embodiment, a method may produce a holographic waveguide configured to correct aberrations when manufactured.

Figure 4F:
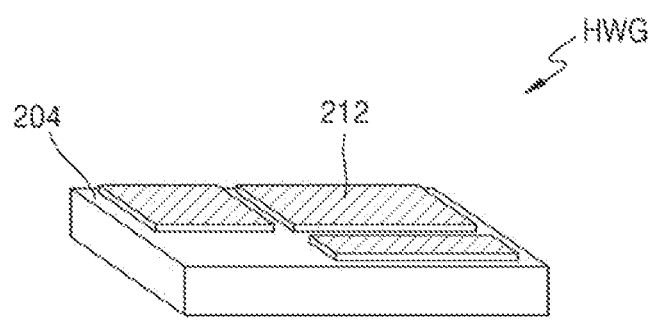

FIG. 4F illustrates the holographic waveguide HWG including a plurality of sets each including a diffractive optical element 212 and an aberration correction hologram pattern, fixed to a plurality of positions of the waveguide element 204, according to an embodiment. Angles of incidence of light on the diffractive optical element 212 at the plurality of positions on the waveguide element 204 may be different from each other, and a hologram pattern for each position may be set by using aberrations detected by using an appropriate angle of incidence.

Figure 5A:
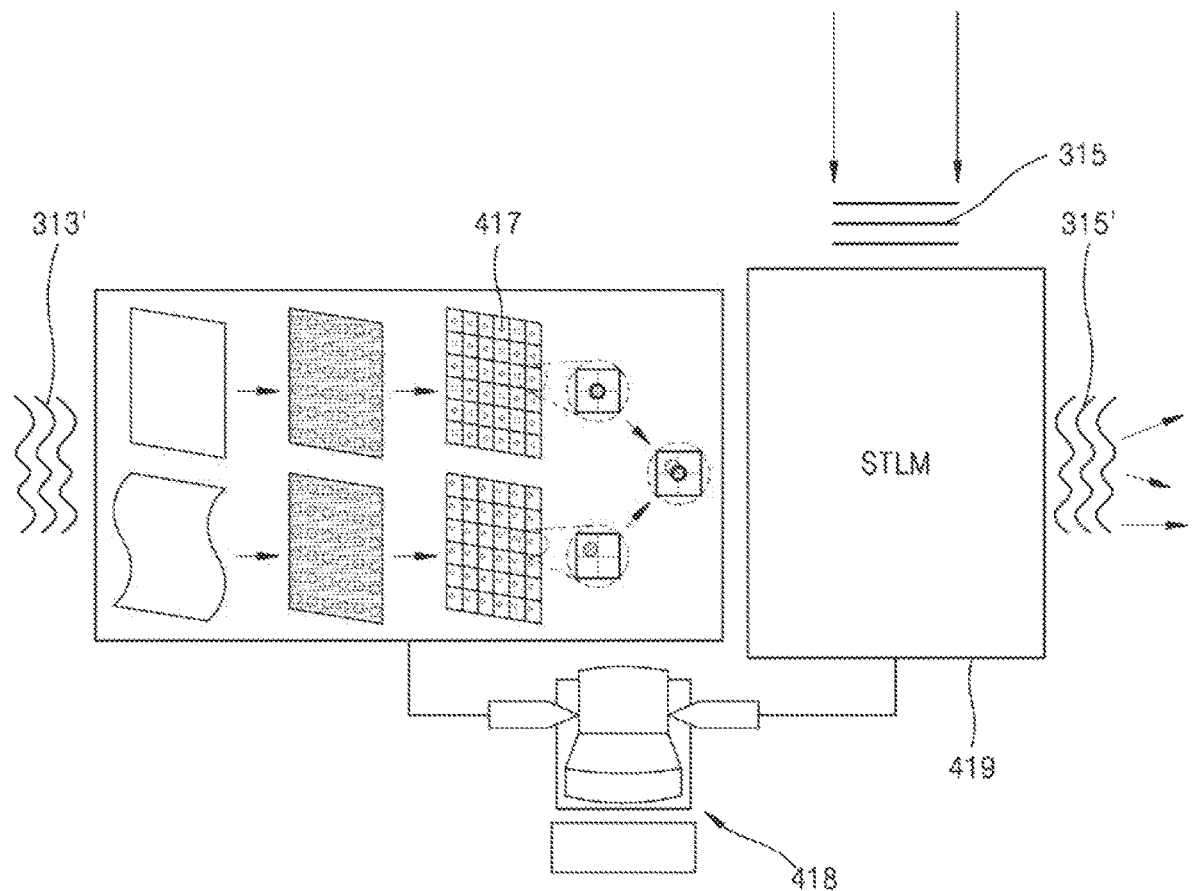
FIGS. 5A, 5B, and 5C illustrate a wavefront detection and phase conjugation unit according to embodiments.
Figure 5B:
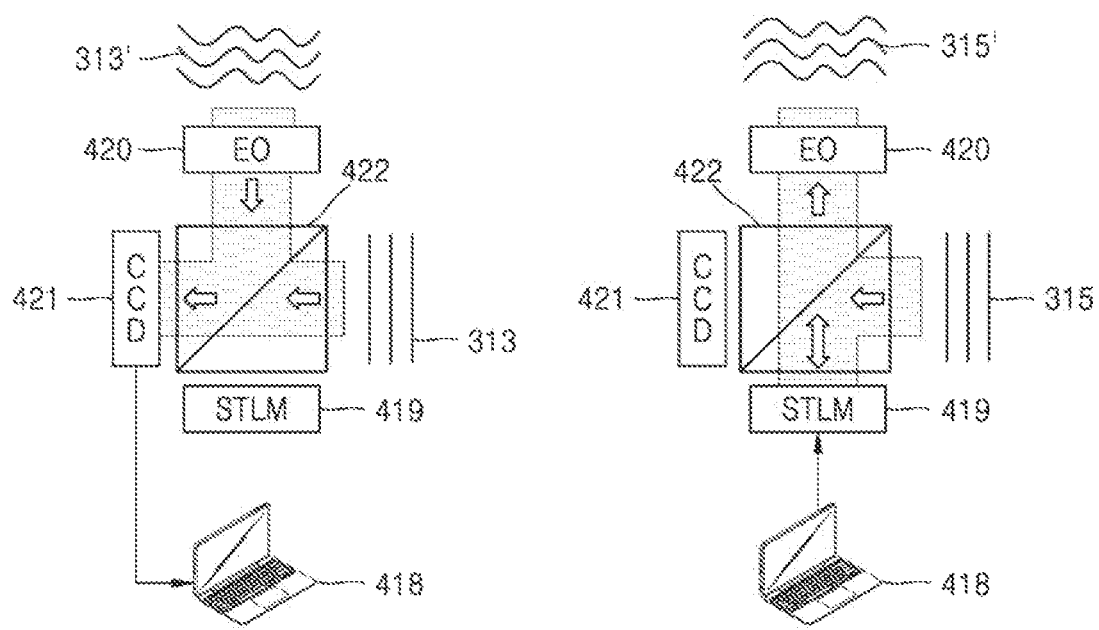
Figure 5C:
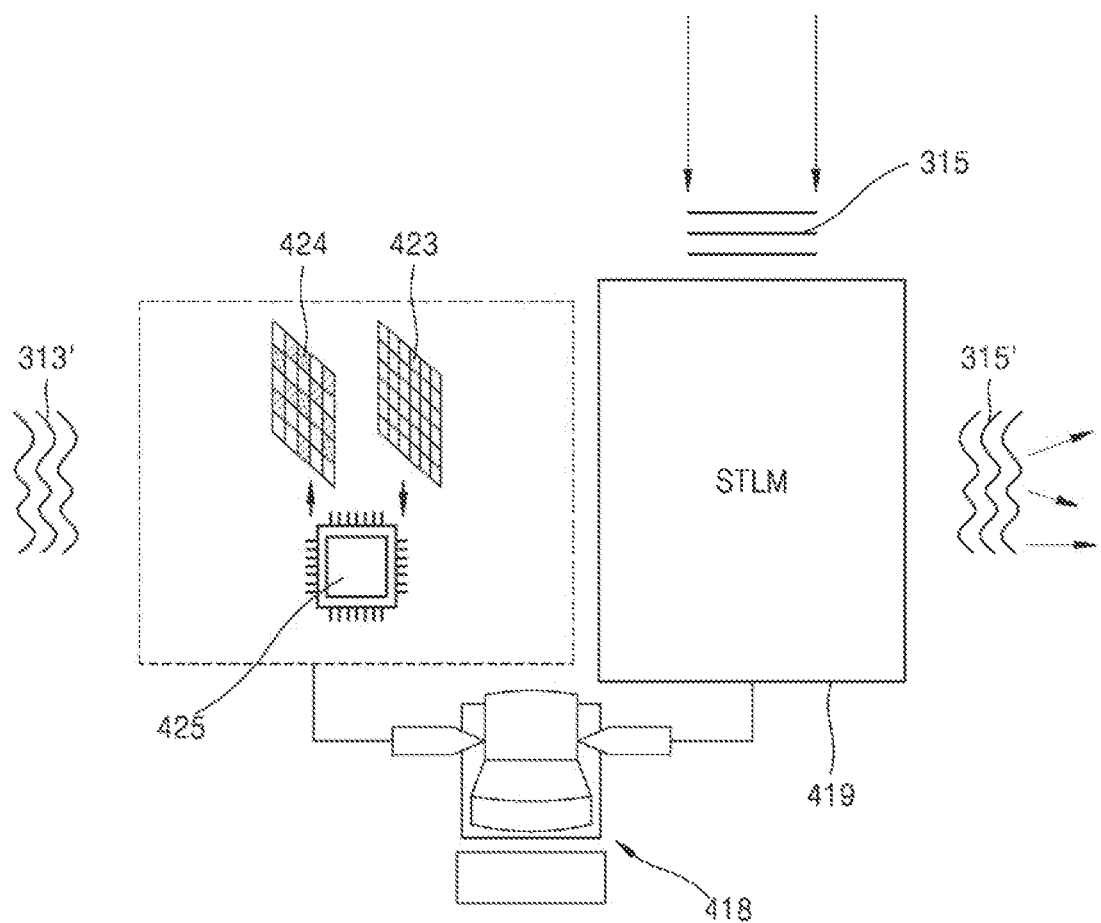

FIGS. 5A to 5C illustrate embodiments of the wavefront detection and phase conjugation unit 314 for implementing a method of producing the holographic waveguide HWG, according to an embodiment. The wavefront detection and phase conjugation unit 314 may be implemented as a single unit that combines two functions of wavefront detection and phase conjugation, or may be implemented as separate subunits each performing its own function.

FIG. 5A illustrates a wavefront detection and phase conjugation unit 314 that includes a Shack-Hartmann wavefront sensor 417, a computerized controller 418 and a space-time light modulator (STLM) 419 according to an embodiment.

The wavefront detection and phase conjugation unit 314 may operate as follows.

The inspection 313' that has passed through the local structure formed by the waveguide element 204 and the holographic medium fragment 212' may be detected by the Shack-Hartmann wavefront sensor 417. Then, the phase-conjugated aberrations with respect to the aberrations of the inspection wave 313' that has passed through the local structure formed by the waveguide element 204 and the holographic medium fragment 212' may be calculated by the computerized controller 418. The computerized controller may include at least one processor. Then, by using the plane object wave 315 and the calculated phase-conjugated aberrations, the pre-aberrated object wave 315' with the phase-conjugated aberrations with respect to the detected aberrations of the inspection wave 313' that has passed through the local structure formed by the waveguide element 204 and the holographic medium fragment 212' may be formed. The pre-aberrated object wave 315' may be formed by the STLM 419.

FIG. 5B schematically illustrates the wavefront detection and phase conjugation unit 314 including the computerized controller 418, the space-time light modulator (STLM) 419, an electro-optical (EO) modulator 420, a CCD array 421, and a beam splitter 422, according to another embodiment.

The wavefront detection and phase conjugation unit 314 may operate as follows.

The inspection wave 313 and the inspection wave 313' that has passed through the local structure formed by the waveguide element 204 and the holographic medium fragment 212' may form an interference pattern on a plane of the CCD array 421. The inspection wave 313' that has passed through the local structure formed by the waveguide element 204 and the holographic medium fragment 212' may be directed to the CCD array 421 through the beam splitter 422. A relative phase between the inspection wave 313 and the inspection wave 313' may be controlled by the electro-optical (EO) modulator 420. In this case, the amplitude and the phase of the inspection wave 313' that has passed through the local structure formed by the waveguide element 204 and the holographic medium fragment 212' may be uniquely determined by using the phase-shifting interferometry technique described above. Then, the phase-conjugated aberrations with respect to the aberrations of the inspection wave 313' may be calculated by the computerized controller 418. Then, the plane object wave 315 may be transmitted to the space-time light modulator 419 by using the beam splitter 422, and the pre-aberrated object wave 315' with the phase-conjugated aberrations with respect to the detected aberrations of the inspection wave 313' that has passed through the local structure formed by the waveguide element 204 and the holographic medium fragment 212' may be formed by using the calculated phase-conjugated aberrations.

FIG. 5C schematically illustrates the wavefront detection and phase conjugation unit 314 including the computerized controller 418, the space-time light modulator (STLM) 419, a CMOS array 423, and a phase liquid crystal space-time light modulator (LC STLM) 424, according to another embodiment. According to the embodiment, by using the phase LC STLM 424, the CMOS array 423, and a processor 425 together, the spatial resolution may be improved by more than 100 times compared to the Shack-Hartmann sensor.

In this case, the wavefront detection and phase conjugation unit 314 may operate as follows.

The inspection wave 313' that has passed through the local structure formed by the waveguide element 204 and the holographic medium fragment 212' may be transmitted to the phase LC STLM 424. The phase LC STLM 424 may modulate the transmitted wave by using several randomly specified patterns, and the intensity of the wave transmitted through the phase LC STLM 424 may be measured by using the CMOS array 423. The resulting data may be processed by the processor 425 by using a computational phase search algorithm that calculates the complex amplitude of the inspection wave 313' incident on the CMOS array 423. Then, the phase-conjugated aberrations with respect to the aberrations of the inspection wave 313' that passed through the local structure may be calculated by the computerized controller 418. Then, the pre-aberrated object wave 315' with the phase-conjugated aberrations with respect to the detected aberrations of the inspection wave 313' that has passed through the local structure formed by the waveguide element 204 and the holographic medium fragment 212' may be formed by using the calculated phase-conjugated aberrations and the plane object wave 315. The pre-aberrated object wave 315' may be formed by the space-time light modulator 419.

Accordingly, when recording the diffractive optical element 212, the aberrations due to the waveguide 204 and the holographic medium fragment 212' may be considered to have an opposite sign.

All of the holographic medium fragments 212' to be used for producing the holographic waveguide HWG for the virtual and augmented reality device 200 may be recorded in a similar scheme, and may be arranged at each position of the waveguide element 204, respectively. The number, position, and structure of the diffractive optical elements 212 are not limited to the configuration illustrated in FIG. 4F, and may vary depending on the design of the virtual and augmented reality device 201. The diffractive optical element 212 may be formed by using the same holographic medium fragments or holographic medium fragments different from each other.

The aberration correction hologram pattern included in each diffractive optical element 212 may be recorded such that pre-aberrations are detected, and these detected pre-aberrations are recorded on the diffractive optical element 212 as an aberration correction hologram pattern in the recording operation.

By this approach, each diffractive optical element 212 may perform a dual function. The diffractive optical element 212 may perform deflection and/or guidance of a wave propagating along the waveguide element 204, and may simultaneously compensate for the aberrations caused by the local structure formed by the waveguide element 204 and the holographic medium fragment 212'. In addition, the diffractive optical element 212 may be configured as a transmissive or reflective element. For example, the transmissive diffractive optical element 212 may convert incident light passing through the element, whereas the reflective diffractive optical element 212 may convert incident light being reflected from the element.

Because of this combination of functions, image quality may be maintained during image transmission using non-ideal holographic media and waveguide elements, and the need for additional components for pre- or post-processing of images in virtual and augmented reality devices may be eliminated. According to embodiments, a holographic waveguide is provided that enables a more compact and inexpensive design of virtual and augmented reality devices.

For example, photopolymers, photothermoplastics, photochromic materials, photothermorefractive materials, photoresists, silver halide photographic materials, or dichromated gelatins may be used as a holographic medium. Here, the holographic medium fragment may be in the form of a film or layer with a defined thickness and a geometric shape. The thickness and the geometric shape may vary depending on the architecture of the virtual and augmented reality device.

In addition, glass, glass-ceramics, crystalline materials, polymers, and other media may be used as the holographic medium, because they have sufficient light transmittance in the visible region of the spectrum. A microstructure may be formed thereon in a constant or variable period according to a given rule, such that light may be diffracted in the microstructure, and such a microstructure may be preserved in the medium for a relatively long time or permanently. The medium may be a sprayed film/layer or a grown film/layer, and may be a film/layer of optical contact or a bonded film/layer.

Figure 6A:
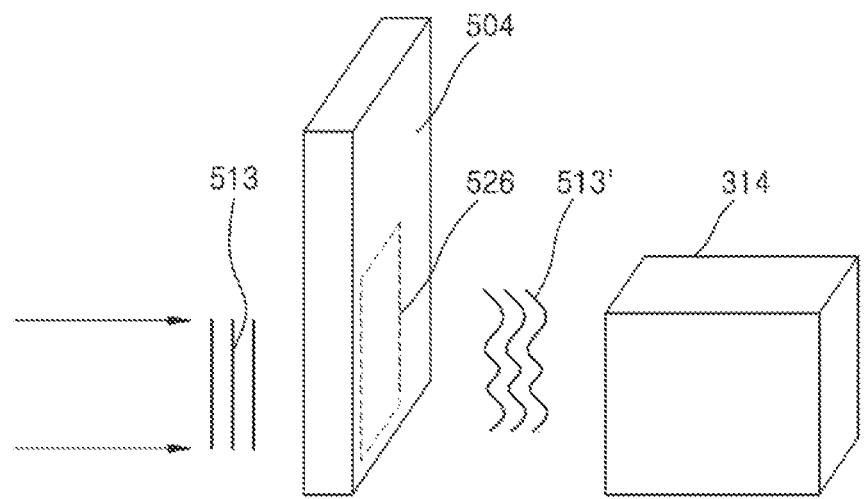
FIGS. 6A and 6B illustrate a process of producing a holographic waveguide according to another embodiment.
Figure 6B:
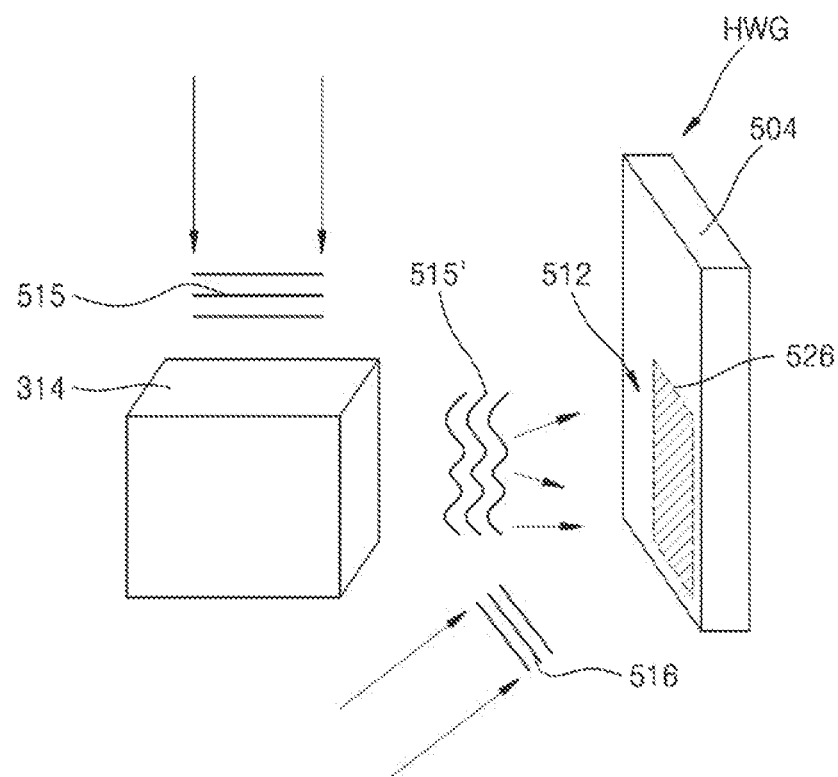

FIGS. 6A and 6B are diagrams illustrating a process of producing the holographic waveguide HWG according to another embodiment.

This embodiment provides a method using a photosensitive waveguide element, and it is different from that illustrated in FIG. 4A in that it does not require a process of fixing a separate holographic medium fragment to the waveguide element because an aberration correction hologram pattern is recorded directly on the waveguide element. The remaining operations are substantially the same as those described with reference to FIGS. 2 to 5C.

As illustrated in FIG. 6A, a photosensitive waveguide element 504 is provided. The waveguide element 504 may have a flat or curved shape. The waveguide element 504 may have a defect that causes an aberration, as described above. Aberrations caused by the waveguide element 504 may be detected by using an inspection wave 513. To this end, the inspection wave 513 may be transmitted through a local structure, on which an aberration correction hologram pattern is to be recorded, at a preset position 526 of the photosensitive waveguide element 504. Aberrations of an inspection wave 513' that has passed through the local structure may be detected by the wavefront detection and phase conjugation unit 314, and phase-conjugated aberrations with respect to the detected aberrations may be calculated.

As illustrated in FIG. 6B, the calculated phase-conjugated aberrations may be imparted to an object wave 515 to form a pre-aberrated object wave 515'. Then, an aberration correction hologram pattern may be recorded directly at the preset position 526 of the photosensitive waveguide element 504, and thus the diffractive optical element 512 may be formed. For example, the holographic waveguide HWG including the diffractive optical element 512 including the aberration correction hologram pattern may be formed.

As illustrated in FIGS. 6A and 6B, the aberration correction hologram pattern is recorded on the local structure that is used for the detection of the aberrations of the inspection wave 313, and is the same as the preset position 526 of the waveguide element 504, so as to form the diffractive optical element 512. The number, position, and structure of the diffractive optical elements 512 are not limited to the illustrated configuration, and may vary depending on the design of the virtual and augmented reality device employing the holographic waveguide HWG.

A photosensitive material on which a hologram pattern may be recorded may be used for the material of the photosensitive waveguide element 504. For example, crystalline materials (e.g., photochromic or photothermorefractive crystals), glass (e.g., photochromic or photothermorefractive glass), glass-ceramics, photopolymer materials (polymethyl methacrylate (PMMA) and other photopolymers), and the like may be used. Because the photosensitive waveguide element 504 also functions as a holographic medium, there is no need to apply a separate holographic medium.

Figure 7A:
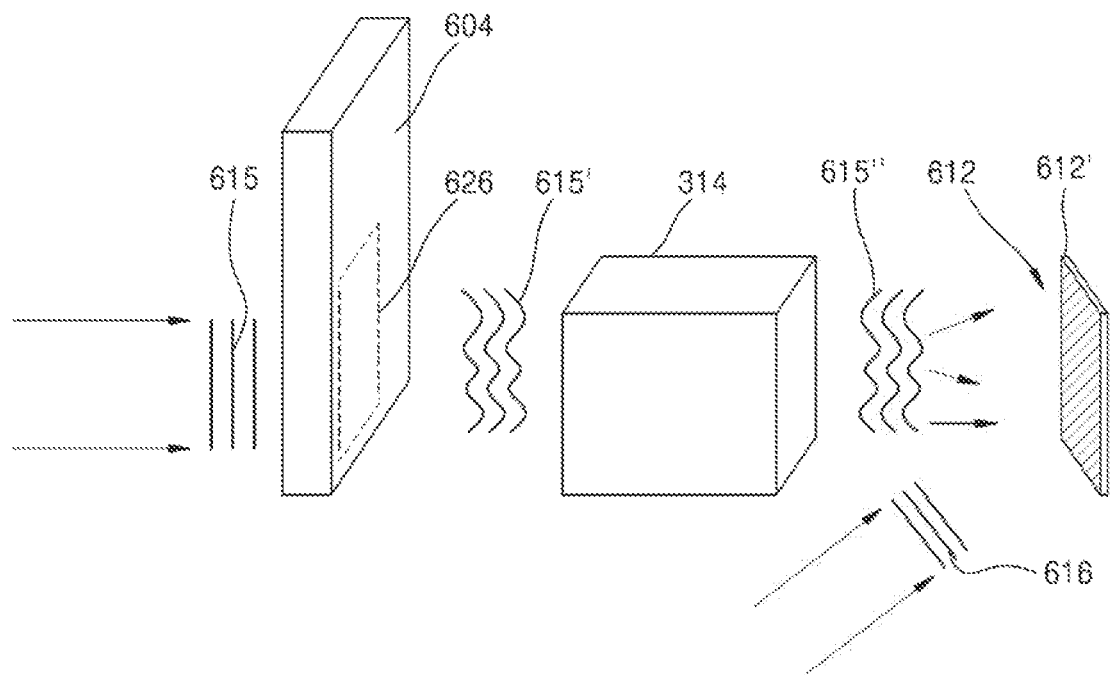
FIGS. 7A and 7B illustrate a process of producing a holographic waveguide according to another embodiment.
Figure 7B:
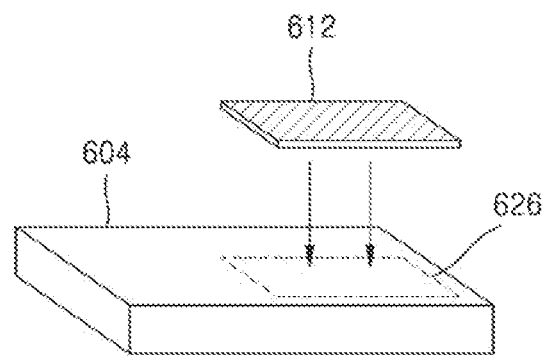

FIGS. 7A and 7B illustrate a process of producing the holographic waveguide HWG according to another embodiment.

According to the embodiment, an aberration correction hologram pattern may be recorded on a holographic medium with a significantly low recording threshold. Examples of such media include photothermorefractive crystals, photochromic materials, silver halide photographic materials, dichromated gelatins, etc.

In this case, it may be very difficult to use an inspection wave in the operation of detecting aberrations due to a local structure formed by a waveguide element and a holographic medium fragment, because even a weak, low-energy wave may affect the holographic medium.

As illustrated in FIG. 7A, a waveguide element 604 may be provided. The waveguide element 604 may have a flat or curved shape, and may have a defect that causes an aberration. In this case, as the inspection wave is not used, a planar object wave 615 may be provided to the waveguide element 604, and aberrations due to only the waveguide element 604 may be detected. An aberrated object wave 615' that has passed through the waveguide element 604 and thus been aberrated, may pass through the wavefront detection and phase conjugation unit 314 to be output as a pre-aberrated object wave 615". That is, the aberrated object wave 615' may be incident on the wavefront detection and phase conjugation unit 314, thus the aberrations may be detected, phase-conjugated aberrations may be calculated for the detected aberrations, and then, the pre-aberrated object wave 615" with the calculated phase-conjugated aberrations may be output. Then, the aberration correction hologram pattern may be recorded on a holographic medium fragment 612' with a significantly low recording threshold by using the pre-aberrated object wave 615" and an aberration-free reference wave 616, and thus a diffractive optical element 612 may be formed.

Then, as illustrated in FIG. 7B, the diffractive optical element 612 with the aberration correction hologram pattern formed thereon may be fixed to the waveguide element 604. A preset position 626 at which the diffractive optical element 612 is fixed to the waveguide element 604 is identical to a position of a region on which the object wave 615 was incident when detecting the aberrations of the waveguide element 604.

In contrast to the embodiments illustrated in FIGS. 4A and 4B in which the aberrations are detected after the holographic medium fragment 212' has been fixed to the waveguide element 204, according to this embodiment, the diffractive optical element 612 formed by recording the aberration correction hologram pattern on the holographic medium fragment 612', is fixed to the waveguide element 604.

The number, position, and structure of the diffractive optical elements 612 are not limited to the illustrated configuration, and may vary depending on the design of the virtual and augmented reality device employing the holographic waveguide HWG.

Figure 8:
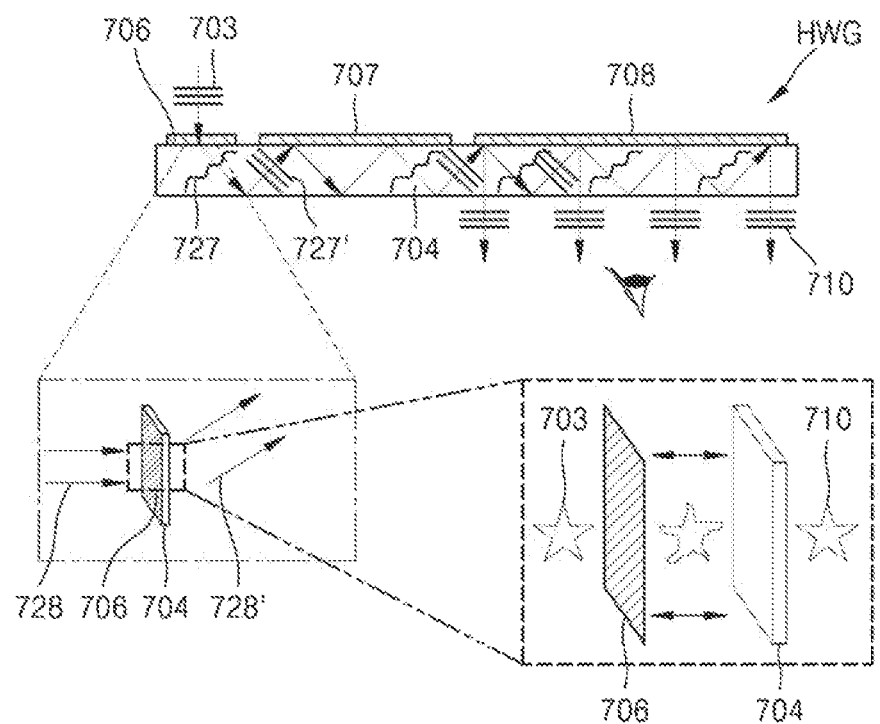
FIG. 8 illustrates a structure of a holographic waveguide, according to an embodiment.

FIG. 8 illustrates a schematic structure of the holographic waveguide HWG, according to an embodiment.

The holographic waveguide HWG may include a waveguide element 704 and diffractive optical elements 706, 707, and 708, for example, also referred to as the input diffractive optical element 706, the enlargement diffractive optical element 707, and the output diffractive optical element 708. The diffractive optical elements 706, 707, and 708 may perform a function of coupling light into and out of the waveguide element 704 or redirecting light in the waveguide element 704, and aberration correction hologram patterns may be recorded on the diffractive optical elements 706, 707, and 708, respectively.

As illustrated, the holographic waveguide HWG may include the input diffractive optical element 706 for inputting an image to the waveguide element 704, the enlargement diffractive optical element 707 configured to increase the geometric dimensions of the image being transmitted in the waveguide element 704, and the output diffractive optical element 708 for outputting the image from the inside of the waveguide element 704 to the outside.

The number, position, and structure of the diffractive optical elements 706, 707, and 708 are not limited to the configuration illustrated in FIG. 8, and may vary depending on the design of the virtual and augmented reality device employing the holographic waveguide HWG.

The holographic waveguide HWG may operate as follows in the virtual and augmented reality device.

An aberration-free source image 703 may be input into the waveguide element 704 from the image source 202 of the virtual and augmented reality device 200 through one or more input diffractive optical elements 706.

When the image is passing through the holographic waveguide HWG, aberrations due to each local structure formed by the waveguide element 704 and each of holographic medium fragments that constitute the diffractive optical elements 706, 707, and 708 may be compensated for when the image passes through each local structure.

This may be described by an example of propagation of a wavefront 727 reconstructed by the diffractive optical element 706. The wavefront 727 may have phase-conjugated aberrations with respect to aberrations introduced by a local structure formed by the waveguide element 704 and the holographic medium fragment that constitutes the diffractive optical element 706, and, through this local structure, the wavefront 727 may travel along the same optical path as when recording the diffractive optical element 706.

For example, the aberrations imparted to the wavefront 727 may be the phase-conjugated aberrations with respect to the aberrations that occurs due to the local structure, and the aberrations due to the local structure and the phase-conjugated aberrations may compensate for each other when the wavefront 727 propagates through the waveguide element 704. Therefore, a reconstructed wave 727' is not aberrated.

This aberration compensation approach may be used for an arbitrary number of diffractive optical elements arranged in the waveguide element 704, and accordingly, an aberration-free image 710 may be output from the holographic waveguide HWG to the user's eye.

This may be further described by an example of passing of a readout wave 728 through the diffractive optical element 706. The diffractive optical element 706 may compensate for the aberrations introduced by the local structure formed by the waveguide element 704 and the holographic medium fragment that constitutes the diffractive optical element 706, and a readout wave 728' that has passed through the local structure is not aberrated.

In a case where the holographic waveguide HWG with the aberration correction hologram pattern is used as part of the virtual and augmented reality device, the holographic waveguide HWG may be illuminated with the readout wave 728 with the same wavelength as when recording the aberration correction hologram pattern. A wavefront reconstructed from the aberration correction hologram pattern may have the phase-conjugated aberrations with respect to the aberrations due to the local structure formed by the waveguide element and the holographic medium fragment, and may pass through the same optical path as when recording the aberration correction hologram pattern, through the waveguide element 704 and the diffractive optical element 706 on which the aberration correction hologram pattern is formed. The phase-conjugated and non-conjugated aberrations may compensate for each other by such propagation through the holographic waveguide HWG.

The spatially varying amplitude transmittance $\tau(x, y)$ of an aberrating waveguide element and a holographic medium fragment may satisfy Equation 1 below.

$$\tau(x,y)=\exp(j\varphi(x,y)) \qquad \text{[Equation 1]}$$

Here, $\varphi(x, y)$ is a phase shift, and is an arbitrary function of a position with coordinates x, y in a plane perpendicular to the direction of propagation of a wavefront through the waveguide element and the holographic medium fragment, x is the first coordinate of a Cartesian coordinate system in the plane perpendicular to the direction of propagation of the wavefront through the waveguide element and the holographic medium fragment, y is the second coordinate of the Cartesian coordinate system in the plane perpendicular to the direction of propagation of the wavefront through the waveguide element and the holographic medium fragment, and j is the imaginary unit.

The diffractive optical element with the aberration correction hologram pattern recorded by the pre-aberrated object wave with the phase-conjugated aberrations with respect to the aberrations imparted to the inspection wave having passed through the local structure formed by the waveguide element and the holographic medium fragment, and the aberration-free reference wave, may have the same amplitude transmittance as $\tau^*(x, y)$. Here, the asterisk (*) denotes a complex conjugate. When the aberration correction hologram pattern is read out, an object illuminated in the image projector may have a complex amplitude distribution A(x, y) in the plane of the diffractive optical element. After passing through the aberration correction hologram pattern recorded on the holographic medium fragment and then passing through the aberrating waveguide element, distribution of light diffracted may satisfy Equation 2 below.

$$\tau^*(x,y)\tau(x,y)A(x,y)=A(x,y) \qquad \text{[Equation 2]}$$

Therefore, an object image having passed through the aberrating holographic medium fragment and the aberrating waveguide element may be viewed without distortion. Because all aberration correction hologram patterns fixed to the waveguide element are recorded in a similar scheme, the aberrations due to the waveguide element and the holographic medium fragment may be removed, and thus a resulting output virtual image is not aberrated.

Figure 9A:
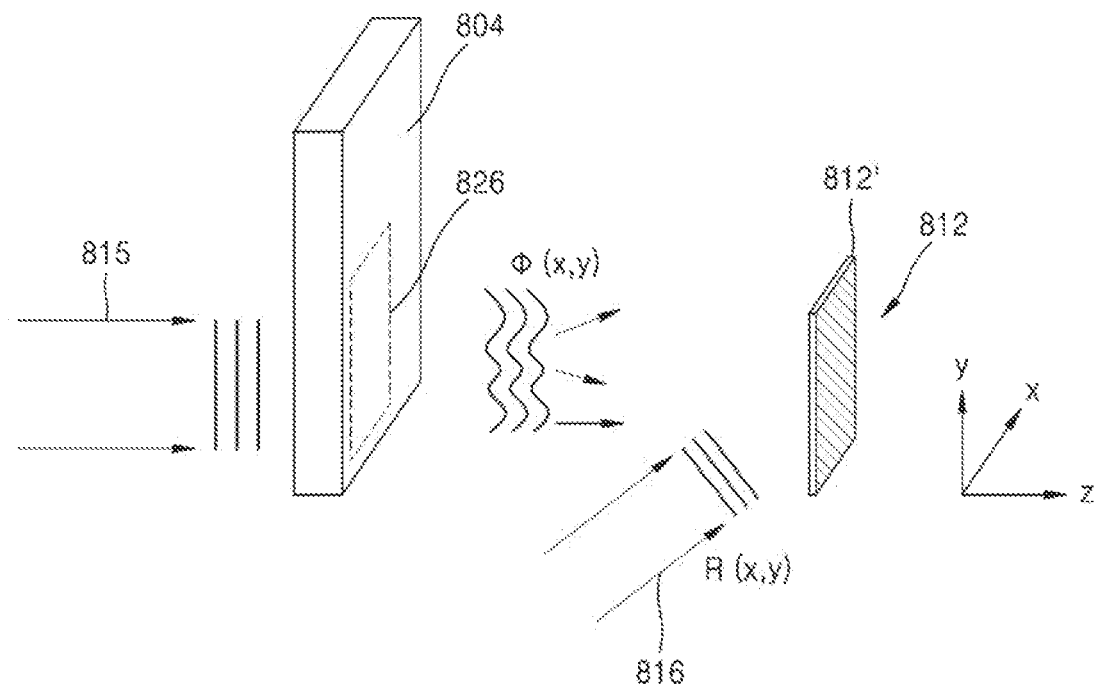
FIGS. 9A and 9B illustrate a process of producing a holographic waveguide according to another embodiment.
Figure 9B:
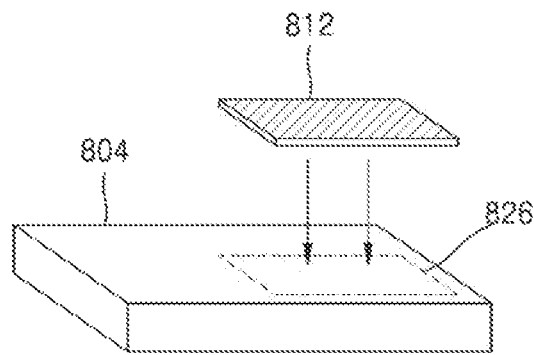

FIGS. 9A and 9B illustrate a process of producing the holographic waveguide HWG according to another embodiment.

This embodiment may include a thin holographic medium. In a case of a thin holographic medium, the aberrations due to the waveguide element may be recorded directly on the holographic medium in the form of a hologram pattern without introducing, into an object wave, the pre-aberrations of the phase-conjugated aberrations with respect to the aberrations due to the waveguide element. Here, only the aberrations due to the waveguide element is recorded on a thin holographic medium fragment, and the calculation of the phase-conjugated aberrations is omitted. This embodiment is based on the fact that, while the diffractive optical element is formed by using an object wave with the aberrations due to the waveguide element, a function for the phase-conjugated aberrations is recorded directly on the diffractive optical element. This embodiment is possible in a case of recording a hologram pattern on a thin holographic medium fragment, because, while optical diffraction for the hologram pattern recorded on the thin holographic medium fragment occurs, at least several reconstructed waves (except for orders of diffraction of −1, 0, and 1) are formed, and one of them contains information about the phase-conjugated aberrations with respect to the aberrations due to the waveguide element. For example, the phase-conjugated aberrations with respect to the aberrations due to the waveguide element exist in a readout wavefront passing through the diffractive optical element, and accordingly, compensation with respect to the aberrations caused by the waveguide element occurs.

It may be described mathematically that one of the reconstructed waves from the diffractive optical element recorded on the thin holographic medium fragment actually contains an aberration-free complex amplitude distribution of the image that has passed through the aberrating waveguide element.

Referring to FIG. 9A, when recording the aberration correction hologram pattern on a thin holographic medium fragment 812', an aberration-free plane object wave 815 may pass through a local structure at a preset position 826 of a waveguide element 804. Aberrations due to the waveguide element 804 are represented by a phase aberration function $\phi(x, y)$.

The object wave imparted with the aberrations $\phi(x, y)$ after passing through the waveguide element 804 may interfere with an aberration-free plane reference wave R(x, y) 816, a resulting interference pattern may be recorded on the thin holographic medium fragment 812', and thus a diffractive optical element 812 may be formed.

The spatially varying phase aberration function $\phi(x, y)$ satisfies Equation 3 below.

$$\phi(x,y)=\exp(j\varphi(x,y)) \qquad \text{[Equation 3]}$$

Here, $\varphi(x, y)$ is a phase shift, and is an arbitrary function of a position with coordinates x, y in a plane perpendicular to the direction of propagation (Z direction) of a wavefront that passed through the waveguide element 804, x is the first coordinate of a Cartesian coordinate system in the plane perpendicular to the direction of propagation of the wavefront that has passed through the waveguide element, y is the second coordinate of the Cartesian coordinate system in the plane perpendicular to the direction of propagation of the wavefront that has passed through the waveguide element, and j is the imaginary unit.

The amplitude R(x, y) of the reference wave 816 satisfies Equations 4 and 5 below.

$$R(x,y)=\exp(j2\pi\gamma y) \qquad \text{[Equation 4]}$$

$$\gamma=\sin\theta/\lambda \qquad \text{[Equation 5]}$$

Here, $\theta$ is the angle between two recording beams, and $\lambda$ is the wavelength of light recording an aberration correction hologram pattern.

As a result, the intensity of the interference pattern in a plane of the diffractive optical element 812 on which the aberration correction hologram pattern that is recorded satisfies Equation 6 below.

$$\iota(x,y)=|\Phi(x,y)+R(x,y)|^2=2+\Phi(x,y)R^*(x,y)R(x,y) \quad \text{[Equation 6]}$$

Assuming that the transmittance H(x, y) of the diffractive optical element 812 is proportional to the exposing intensity, the transmittance satisfies Equation 7 below.

$$H(x,y)=\kappa I(x,y) \quad \text{[Equation 7]}$$

Here, κ is a proportional factor.

Thereafter, referring to FIG. 9B, the diffractive optical element 812 formed by recording the aberration correction hologram pattern on the thin holographic medium may be fixed to the preset position 826 of the waveguide element 804.

Figure 10:
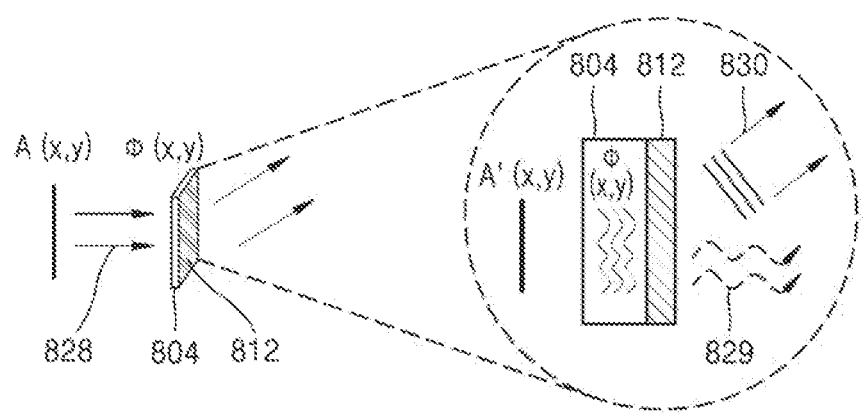
FIG. 10 illustrates an operation of a holographic waveguide manufactured according to the description of FIGS. 9A and 9B when employed in a virtual and augmented reality device according to an embodiment.

FIG. 10 illustrates an operation of the holographic waveguide HWG manufactured according to the description of FIGS. 9A and 9B when employed in a virtual and augmented reality device, according to an embodiment.

During operation of the virtual and augmented reality device, a readout wave 828 may be incident on the holographic waveguide HWG from an image source. The readout wave 828 may be incident on a plane of the waveguide element 804 with a complex amplitude distribution of A'(x, y), and pass through the diffractive optical element 812. The amplitude distribution of the readout wave 828 in the plane of the diffractive optical element 812 is A'(x, y), and, after passing through the diffractive optical element 812, the amplitude satisfies Equation 8 below.

$$T(x,y)=A'(x,y)\Phi(x,y)H(x,y) \quad \text{Equation [8]}$$

Three diffracted waves may occur after the diffractive optical element 812, two diffracted waves 829 and 830 of which are illustrated in FIG. 10. Considering the diffracted wave 830 having a phase aberration function Φ*(x, y) of the waveguide element 804 and the terms of a transmission function H(x, y) of the diffractive optical element 812, the following Equation 9 is obtained.

$$T(x,y)=\kappa A'(x,y)\Phi(x,y)\Phi^*(x,y)R(x,y)=\kappa A'(x,y)R(x,y)= \\ \kappa A'(x,y)\exp(j2\pi\gamma y) \quad \text{[Equation 9]}$$

That is, an aberration-free image for an object may be obtained from the diffracted wave 830 propagating in the direction of the reference wave 816 used for recording.

Next, a method of operating the virtual and augmented reality display device including the holographic waveguide according to an embodiment of the disclosure will be described with reference back to FIG. 3.

The source image 203 may be input from the image source 202 to the holographic waveguide HWG including the diffractive optical elements 206, 207, and 208.

The source image 203 may be transmitted through the holographic waveguide HWG including the diffractive optical elements 206, 207, and 208, such that the aberrations caused by the local structure formed by the waveguide element 204 and the holographic medium fragment on which the diffractive optical elements 206, 207, and 208 are recorded may be compensated for.

The aberration-free virtual image 210 may be output from the holographic waveguide HWG including the diffractive optical elements 206, 207, and 208, to the user's eye.

In the method, while the image travels in the waveguide element 204, an operation of increasing the geometric dimensions of the image by using the diffractive optical element 207.

According to embodiments, the holographic waveguide included in the virtual and augmented reality device may include the diffractive optical element including the aberration correction hologram pattern. According to embodiments, the diffractive optical element may be employed in the virtual and augmented reality device to perform two functions: coupling light into and out of the waveguide element or redirecting light in the waveguide element; and correcting aberrations when waves are propagating.

In the embodiments, the diffractive optical element has been described as an element including an aberration correction hologram pattern recorded by using a holographic medium as a recordable medium. The diffractive optical element in the embodiments described above may be a holographic optical element.

In another embodiment, the aberration correction hologram pattern may be recorded as a diffractive structure of a photoresist or a diffractive structure of a chalcogenide material. For example, a photoresist or a chalcogenide material may be used as the recordable medium. The following description is for a case of using such a recordable diffractive medium.

In addition, both types of recordable media (holographic media, recordable diffractive media) may be simultaneously applied to the holographic waveguide of the virtual and augmented reality device. They may perform the same function when converting transmitted or reflected light. For selecting between the two types of recordable media, a higher diffraction efficiency (i.e., higher intensity of diffracted light) at the diffractive optical element or the ability to better combine with the image source, for example, projector, in terms of spectral and angular properties may be considered in the design of the virtual and augmented reality device.

A method of producing a holographic waveguide having this type of diffractive optical element or a method of producing a holographic waveguide with a combination of the two types is similar to the method described above.

FIGS. 11A to 11F illustrate a process of producing the holographic waveguide HWG, according to another embodiment.

The holographic waveguide HWG according to this embodiment may include a diffractive optical element based on a recordable diffractive medium based on a diffractive structure on a photoresist and a diffractive structure on a chalcogenide material.

Figure 11A:
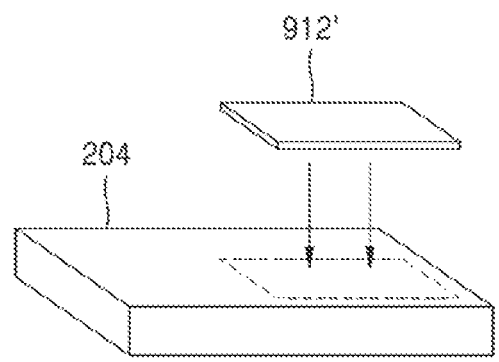
FIGS. 11A, 11B, 11C, 11D, 11E, and 11F illustrate a process of producing a holographic waveguide according to another embodiment.

As illustrated in FIG. 11A, one or more recordable diffractive medium fragments 912' may be fixed to a preset position of the waveguide element 204. The waveguide element 204 may have a flat or curved shape, and may have a defect that causes an aberration. The recordable diffractive medium 912' may include a diffractive structure on a photoresist and a diffractive structure in a chalcogenide material.

Figure 11B:
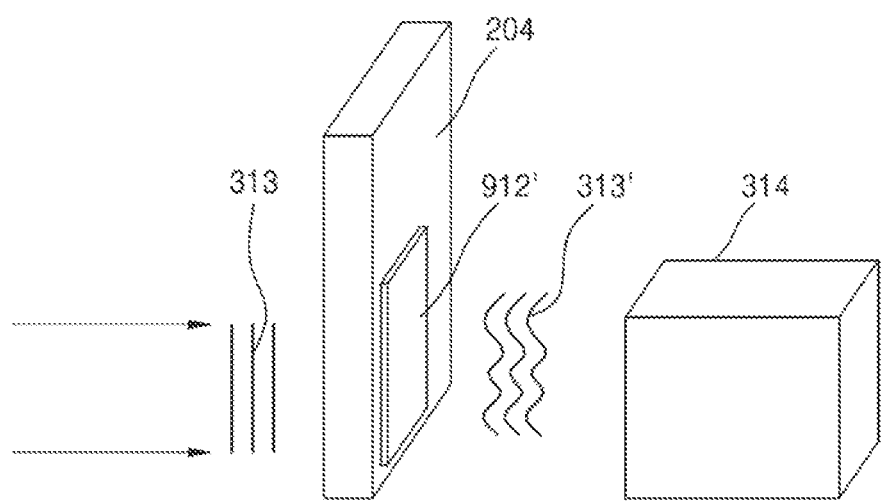
Figure 11C:
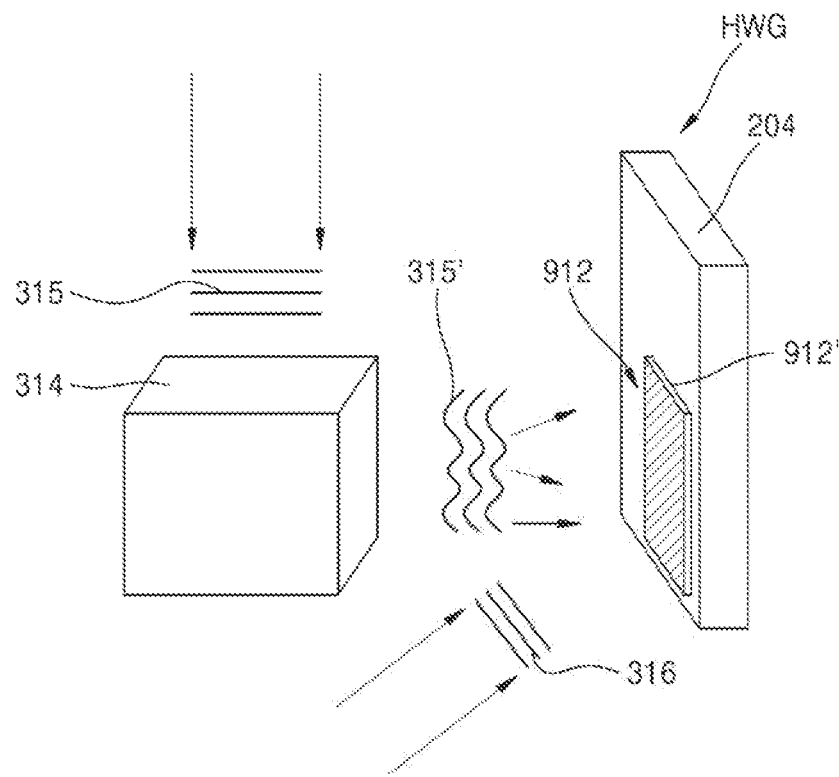
Figure 11D:
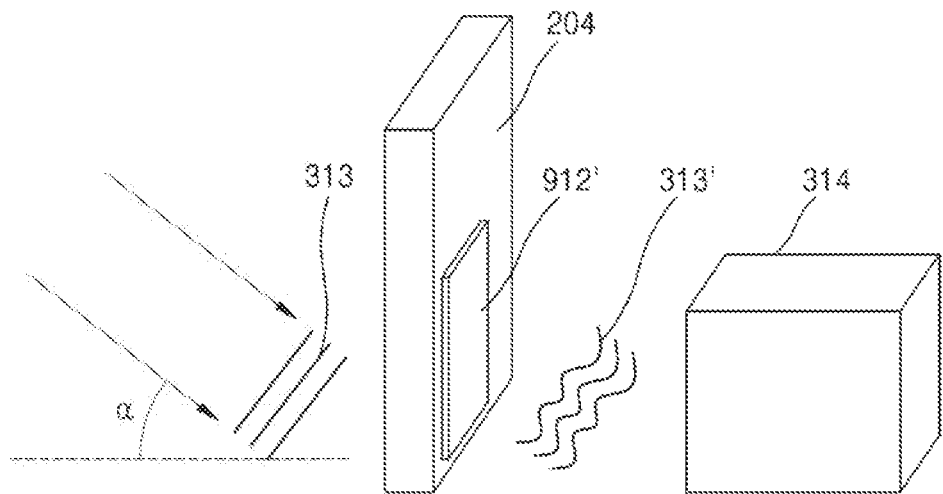
Figure 11E:
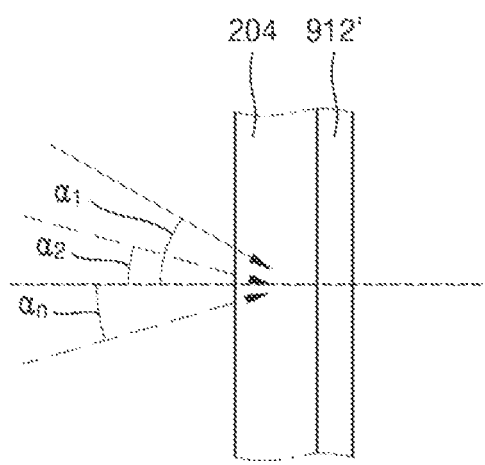

In addition, as illustrated in FIG. 11B, detection of aberrations generated by a local structure formed by the waveguide element 204 and the recordable diffractive medium fragment 912' may be performed by using the inspection wave 313. The inspection wave 313 may have a planar, spherical, or specially selected wavefront shape.

When detecting the aberration, the inspection wave 313 may be aberrated after passing through the local structure formed by the aberrating waveguide element 204 and the aberrating recordable diffractive medium fragment 912'. In addition, as further illustrated in FIGS. 11D and 11E, the inspection wave 313 may be transmitted to the surface of the waveguide element 204 at an arbitrary angle.

The inspection wave 313' having passed through the local structure formed by the waveguide element 204 and the recordable diffractive medium fragment 912' may be imparted with aberrations, and the aberrations may be detected by the wavefront detection and phase conjugation unit 314. The operation is the same as described above. Thereafter, by using phase and amplitude values of the inspection wave 313' obtained by the phase-shifting interferometry technique of the wavefront detection and phase conjugation unit 314, phase-conjugated aberrations with respect to the aberrations of the inspection wave 313' that has passed through the local structure may be calculated. The calculated phase-conjugated aberrations may be imparted to the object wave 315, and thus the pre-aberrated object wave 315' may be formed.

When an aberration correction hologram pattern is recorded on the recordable diffractive medium fragment 912', the pre-aberrated object wave 315' with the calculated phase-conjugated aberrations may be used. The aberration correction hologram pattern using the pre-aberrated object wave 315' and the aberration-free reference wave 316 that may have a planar, spherical, or specially selected wavefront shape, may be recorded. During the recording, a microstructure having a constant or variable period according to a given rule may be formed on the surface or in the volume of the recordable diffractive medium fragment 912', and thus a diffractive optical element 912 may be formed.

While recording, and while the holographic waveguide HWG is operating afterward, the recordable diffractive medium fragment 912' has to remain fixed to the same position of the waveguide element 204 as in the operation of detecting the aberrations of the inspection wave 313. In a case where this condition is met, the phase-conjugated aberrations applied to the diffractive optical element 912 are able to compensate for aberrations that occurs when a wave travels through the same optical path as that used when detecting the aberrations of the inspection wave 313' that has passed through the local structure formed by the waveguide element 204 and the recordable diffractive medium fragment 912', and used when recording the aberration correction hologram pattern on the recordable diffractive medium fragment 912'.

Figure 11F:
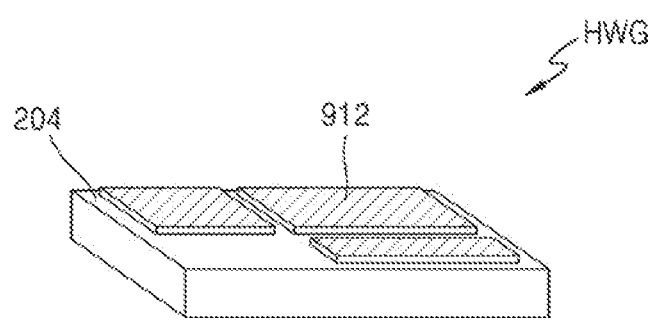

FIG. 11F illustrates the holographic waveguide HWG including a plurality of sets each including a diffractive optical element 212 with an aberration correction hologram pattern recorded thereon, fixed to a plurality of positions of the waveguide element 204 according to an embodiment. Angles of incidence of light on the diffractive optical element 912 at the plurality of positions on the waveguide element 204 may be different from each other, and a hologram pattern for each position may be set by using aberrations detected by using an appropriate angle of incidence.

Figure 12A:
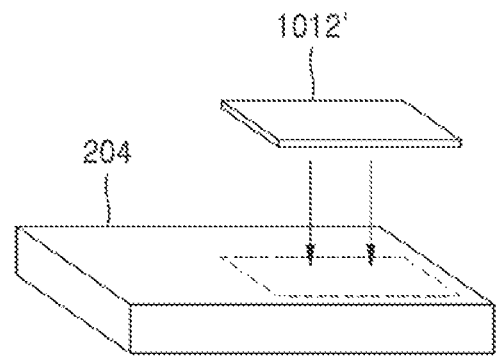
FIGS. 12A, 12B, and 12C illustrate a process of producing a holographic waveguide according to another embodiment.
Figure 12B:
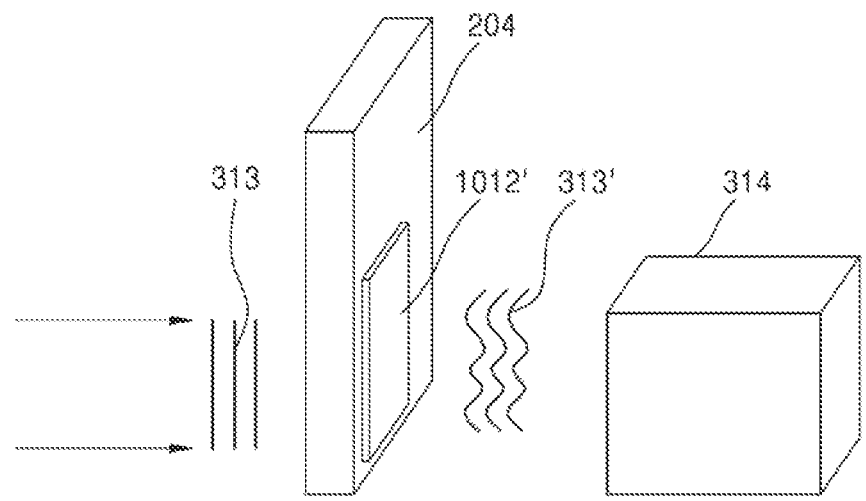
Figure 12C:
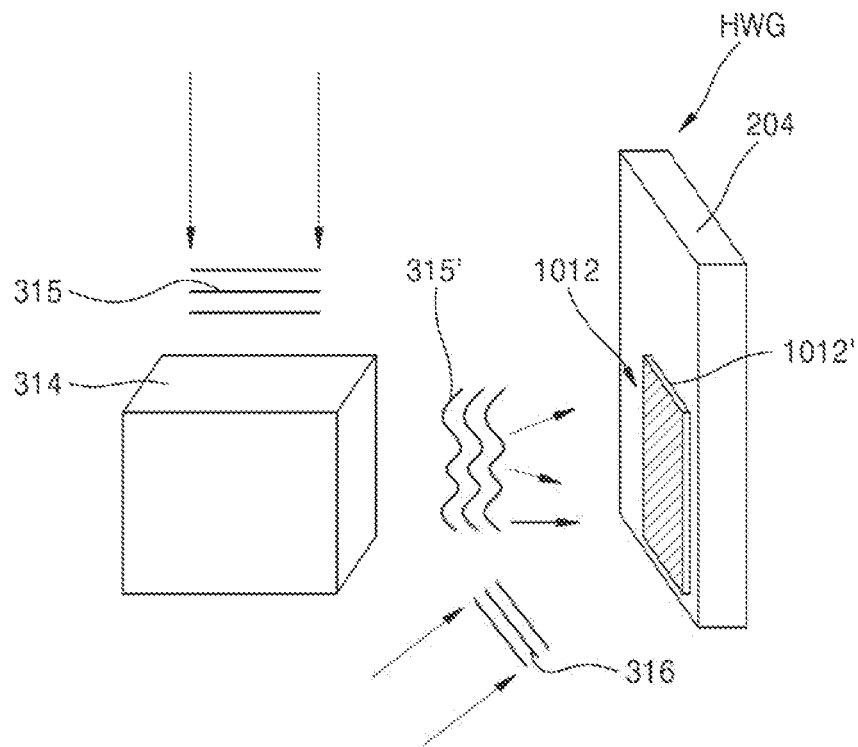

FIGS. 12A to 12C illustrate a process of producing the holographic waveguide HWG according to another embodiment.

This embodiment is different from the embodiment described above in that the holographic waveguide HWG is produced in a configuration in which two types of recordable media are combined.

As illustrated in FIG. 12A, a recordable medium fragment 1012' may be fixed to the waveguide element 204. The recordable medium fragment 1012' may have a configuration in which a holographic medium and a recordable diffractive medium are combined.

As illustrated in FIGS. 12B and 12C, to form a diffractive optical element 1012, the phase-conjugated aberrations with respect to the aberrated inspection wave 313' are detected by using the inspection wave 313, the pre-aberrated object wave 315' is formed by using the phase-conjugated aberrations, and the aberration correction hologram pattern is recorded on the recordable medium fragment 1012', which is the same as described above.

The holographic waveguide described above may be employed in a display device. The holographic waveguide may be employed in a virtual and augmented reality device, and may be in the form of, for example, glasses, helmets, windshield dashboards, or windshield indicators, positioned near the user's eyes and provides virtual and augmented images to the user's eyes.

Figure 13:
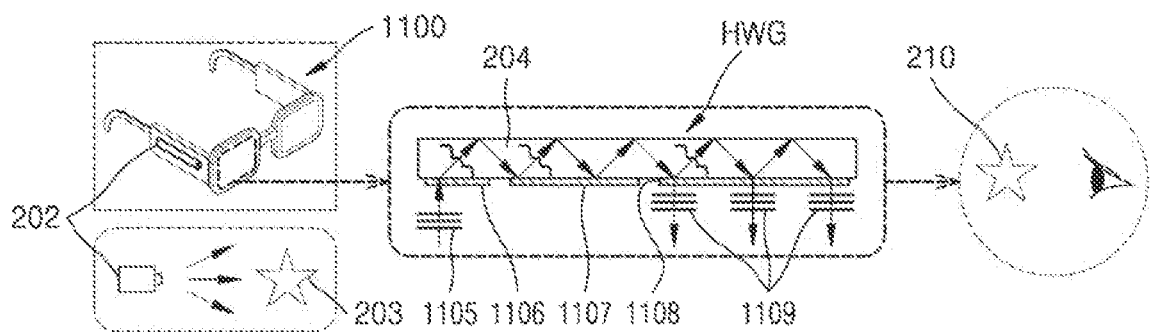
FIG. 13 is a diagram of a virtual and augmented reality device according to another embodiment.

FIG. 13 is a diagram of a virtual and augmented reality device 1100 according to another embodiment.

The virtual and augmented reality device 1100 according to this embodiment is different from that described with reference to FIG. 3 only in that diffractive optical elements 1106, 1107, and 1108 (hereinafter, also referred to as the input diffractive optical element 1106 and the output diffractive optical element 1108) included in the holographic waveguide HWG are formed based on a recordable diffractive medium, and the remaining elements are the same.

The virtual and augmented reality device 1100 including the holographic waveguide HWG may operate as follows.

The aberration-free source image 203 may be input from the image source 202 of the virtual and augmented reality device 1100 to the holographic waveguide HWG through at least one diffractive optical element 1106.

When the source image 203 is passing through a local structure formed by the waveguide element 204 and a recordable diffractive medium fragment on which the aberration correction hologram pattern is recorded, aberrations due to the local structure may be compensated for.

For example, when a plane input wave 1105 is transmitted to the diffractive optical element 1106 of the holographic waveguide HWG produced according to the method proposed herein, the output diffractive optical element 1108 of the holographic waveguide HWG may output an aberration-free plane output wave 1109. In addition, the aberration-free virtual image 210 may be transmitted to the user's eye through the holographic waveguide HWG.

A method of operating the virtual and augmented reality device 1100 including the holographic waveguide HWG including the recordable diffractive medium-based diffractive optical elements is similar to the method of operating the virtual and augmented reality device described with reference to FIG. 3.

The source image 203 may be input from the image source 202 to the holographic waveguide HWG including the diffractive optical elements 1106, 1107, and 1108.

The image may be transmitted through the holographic waveguide HWG including the diffractive optical elements 1106, 1107, and 1108, such that aberrations caused by each local structure formed by the waveguide element 204 and each of recordable diffractive medium fragments of the diffractive optical elements 1106, 1107, and 1108 may be compensated for.

The aberration-free virtual image 210 may be output from the holographic waveguide HWG including the diffractive optical elements 1106, 1107, and 1108, to the user's eye.

In the method, while the image travels in the waveguide element 204, an operation of increasing the geometric dimensions of the image by using the diffractive optical element 1107.

The holographic waveguide described above has the aberration correction hologram pattern, such that an image may be output without generating aberrations on an input image.

Virtual and augmented reality devices employing the holographic waveguide described above may provide an image with almost no aberrations to the user's eyes without performing post-processing for aberration correction.

According to the method of producing a holographic waveguide described above, a holographic waveguide capable of transmitting and outputting an input image hardly generating aberrations in an input image may be provided.

Although the disclosure has been illustrated in the drawings and described in detail in the foregoing description, these drawings and description are to be considered as illustrative or exemplary and not restrictive. The disclosure is not limited to the disclosed embodiments. Other variations to the disclosed embodiments can be understood and effected by those skilled in the art from a review of the drawings, the disclosure, and the appended claims.

Although the embodiments of the holographic waveguide, the method of producing the holographic waveguide, and the virtual and augmented reality device employing the holographic waveguide have been described in detail and illustrated in the accompanying drawings, it should be understood that those embodiments are merely examples and are not intended to limit the disclosure, and the disclosure is not to be limited to the specific configurations illustrated and described herein. This is because various other modifications and embodiments of the disclosure that do not depart from the nature and scope of the disclosure will be apparent to those skilled in the art based on the information included in the description and knowledge of the related technical field. Therefore, the true technical protection scope of the disclosure should be determined by the technical spirit of the disclosure described in the following claims.

What is claimed is:

1. A holographic waveguide comprising:
   a waveguide element configured to guide light; and
   a diffractive optical element comprising an aberration correction hologram pattern, the diffractive optical element being provided adjacent to the waveguide element and configured to correct aberrations generated in the light traveling along the waveguide element by the waveguide element,
   wherein the diffractive optical element is a recordable medium,
   wherein the aberration correction hologram pattern is recorded on the recordable medium, and
   wherein the aberration correction hologram pattern is an interference pattern of an aberration-free reference wave and a pre-aberrated object wave with phase-conjugated aberrations with respect to aberrations caused by a local structure including the waveguide element and the recordable medium.

2. The holographic waveguide of claim 1, wherein the recordable medium comprises photopolymers, photothermoplastics, photochromic materials, photothermorefractive materials, photoresists, silver halide photographic materials, dichromated gelatins, or chalcogenide materials.

3. The holographic waveguide of claim 1, wherein the pre-aberrated object wave is formed by: detecting aberrations of an inspection wave configured to pass the local structure, obtaining the phase-conjugated aberrations with respect to the detected aberrations, and imparting the phase-conjugated aberrations to an object wave based on a light modulator.

4. The holographic waveguide of claim 3, wherein an angle at which the pre-aberrated object wave is incident on the recordable medium when forming the aberration correction hologram pattern is equal to an angle at which the inspection wave is incident on the local structure.

5. The holographic waveguide of claim 3, wherein the aberrations of the inspection wave are detected by using a Shack-Hartmann wavefront sensor, a charge-coupled device (CCD) array, or a complementary metal-oxide-semiconductor (CMOS) array.

6. The holographic waveguide of claim 3, wherein the phase-conjugated aberrations are obtained based on a phase-shifting interferometry technique.

7. The holographic waveguide of claim 3, wherein the light modulator is a micromirror space-time light modulator, a liquid crystal space-time light modulator, or an acousto-optic space-time light modulator.

8. The holographic waveguide of claim 1, wherein the diffractive optical element further comprises:
   an input diffractive optical element configured to input the light into the waveguide element, and
   an output diffractive optical element configured to output, to an outside of the waveguide element, the light input into the input diffractive optical element and guided in the waveguide element.

9. The holographic waveguide of claim 8, wherein the diffractive optical element further comprises an enlargement diffractive optical element configured to increase a geometric dimension of an image included in the light input into the waveguide element.

10. The holographic waveguide of claim 1, wherein the recordable medium is a thin holographic medium, and
    wherein the aberration correction hologram pattern is the interference pattern of the aberration-free reference wave and an object wave aberrated after passing through the waveguide element.

11. The holographic waveguide of claim 1, wherein the waveguide element includes a defect or inhomogeneity.

12. A virtual and augmented reality device comprising:
    a holographic waveguide of claim 1; and
    an image source configured to provide, through the holographic waveguide, an image to be delivered to a user's eye.

13. The virtual and augmented reality device of claim 12, wherein the virtual and augmented reality device is a wearable device.

14. A holographic waveguide comprising:
    a waveguide element configured to guide light; and
    a diffractive optical element comprising an aberration correction hologram pattern, the diffractive optical element being provided adjacent to the waveguide element and configured to correct aberrations generated in the light traveling along the waveguide element by the waveguide element,
    wherein the waveguide element is formed of a photosensitive material,
    wherein the aberration correction hologram pattern is recorded directly on a surface of the waveguide element, and
    wherein the aberration correction hologram pattern is an interference pattern of an aberration-free reference wave and a pre-aberrated object wave with phase-conjugated aberrations with respect to aberrations caused by a local structure including the waveguide element.

15. A method of producing a holographic waveguide, the method comprising:
- providing an inspection wave to be incident on a local structure comprising a waveguide element and a recordable medium fragment;
- detecting aberrations of the inspection wave that has passed through the local structure, and obtaining phase-conjugated aberrations with respect to the detected aberrations;
- forming a pre-aberrated object wave by imparting the phase-conjugated aberrations to an object wave; and
- recording, on the recordable medium fragment, an interference pattern of an aberration-free reference wave and the pre-aberrated object wave.

16. The method of claim 15, wherein an angle at which the pre-aberrated object wave is incident on the recordable medium fragment is equal to an angle at which the inspection wave is incident on the local structure.

17. The method of claim 15, further comprising detecting the aberrations of the inspection wave by using a Shack-Hartmann wavefront sensor, a CCD array, or a CMOS array.

18. The method of claim 15, wherein the phase-conjugated aberrations are obtained based on a phase-shifting interferometry technique.

19. The method of claim 15, wherein the phase-conjugated aberrations are imparted on the object wave by a micromirror space-time light modulator, a liquid crystal space-time light modulator, or an acousto-optic space-time light modulator.

* * * * *